United States Patent [19]
Hirata et al.

[11] Patent Number: 6,094,502
[45] Date of Patent: Jul. 25, 2000

[54] IMAGE FORMATION APPARATUS THAT ALLOWS CORRECTION OF γ CORRECTION DATA AND ADJUSTMENT METHOD THEREOF

[75] Inventors: Katsuyuki Hirata; Kentaro Katori, both of Toyokawa; Masaki Tanaka, Toyohashi, all of Japan

[73] Assignee: Minolta Co., Ltd., Osaka, Japan

[21] Appl. No.: 08/816,052

[22] Filed: Mar. 11, 1997

[30] Foreign Application Priority Data

Mar. 13, 1996 [JP] Japan ................... 8-055913

[51] Int. Cl.⁷ ................ G03F 3/08; H04N 1/46
[52] U.S. Cl. ............... 382/167; 358/519; 358/521; 358/504; 358/406
[58] Field of Search ................... 358/521, 519, 358/406, 504, 523, 518, 520, 501, 530, 447, 448; 382/167, 168–172; 399/72, 15; 347/19; 348/254, 674, 675

[56] References Cited

U.S. PATENT DOCUMENTS

| | | | |
|---|---|---|---|
| 4,751,377 | 6/1988 | Ishizaka et al. | 250/205 |
| 4,888,636 | 12/1989 | Abe | 358/519 |
| 4,979,031 | 12/1990 | Tsuboi et al. | 358/538 |
| 5,060,013 | 10/1991 | Spence | 355/208 |
| 5,148,289 | 9/1992 | Nishiyama et al. | 358/300 |
| 5,258,783 | 11/1993 | Sasanuma et al. | 347/115 |
| 5,353,239 | 10/1994 | Kashiwagi | 382/276 |
| 5,566,372 | 10/1996 | Ikeda et al. | 399/46 |
| 5,579,090 | 11/1996 | Sasanuma et al. | 399/49 |
| 5,583,644 | 12/1996 | Sasanuma et al. | 358/296 |
| 5,589,954 | 12/1996 | Watanabe | 358/519 |
| 5,694,223 | 12/1997 | Katori et al. | 358/300 |
| 5,712,930 | 1/1998 | Watanabe | 382/270 |
| 5,726,780 | 3/1998 | Hirota et al. | 358/520 |

FOREIGN PATENT DOCUMENTS 7-86709  9/1995  Japan .

*Primary Examiner*—Cheukfan Lee
*Attorney, Agent, or Firm*—Burns, Doane, Swecker & Mathis, LLP

[57] ABSTRACT

In a copying machine, a printer control unit calculates γ correction data according to a grid potential Vg and a development bias potential Vb which are image forming parameters, and a calculation coefficient. The printer control unit reads reflectance data of a copied test pattern in a test pattern read out mode to correct the calculation coefficient for the calculation of γ correction data according to the read out data. Thus, γ correction at always the optimum and accurate level can be carried out without usage of a memory of a large capacity.

14 Claims, 19 Drawing Sheets

```
    ( AIDC DETECTION PROCESSING )
                 │
    ┌────────────────────────────────────┐
    │ FORM TEST TONER IMAGE AT           │  S51
    │ PREDETERMINED Vg, Vb, EXPOSURE     │
    │ LEVELS (THREE) FOR EACH COLOR      │
    └────────────────────────────────────┘
                 │
    ┌────────────────────────────────────┐
    │ AIDC DETECTION AND CONVERSION OF   │  S52
    │ DATA INTO AMOUNT OF ADHERING TONER │
    └────────────────────────────────────┘
                 │
    ┌────────────────────────────────────┐
    │ FORM NEXT TEST TONER IMAGE, AND    │  S53
    │ DETERMINE AND UPDATE EXPOSURE LEVELS│
    └────────────────────────────────────┘
                 │
             ( RETURN )
```

| EXPOSURE STEP (STP) | EXPOSURE LEVEL |
|---|---|
| 1 | 32 |
| 2 | 48 |
| 3 | 64 |
| 4 | 80 |
| 5 | 96 |
| 6 | 112 |
| 7 | 128 |
| 8 | 144 |
| 9 | 160 |
| 10 | 192 |
| 11 | 224 |
| 12 | 255 |

FIG. 26A

MAXIMUM DENSITY CORRECTION TABLE

| TABLE NO. | AVERAGE VALUE OF PATTERN DATA READ OUT FOR CYAN MAXIMUM DENSITY CORRECTION | CYAN MAXIMUM DENSITY CORRECTION VALUE tsc |
|---|---|---|
| +3 | 30 AND ABOVE | -15 |
| +2 | 24~29 | -10 |
| +1 | 20~23 | -5 |
| 0 | 14~19 | 0 |
| -1 | 9~13 | +5 |
| -2 | 4~8 | +10 |
| -3 | 3 AND BELOW | +15 |

FIG. 26B

| TABLE NO. | AVERAGE VALUE OF PATTERN DATA READ OUT FOR MAGENTA MAXIMUM DENSITY CORRECTION | MAGENTA MAXIMUM DENSITY CORRECTION VALUE tsc |
|---|---|---|
| +3 | 32 AND ABOVE | -15 |
| +2 | 26~31 | -10 |
| +1 | 22~25 | -5 |
| 0 | 14~21 | 0 |
| -1 | 9~13 | +5 |
| -2 | 4~8 | +10 |
| -3 | 3 AND BELOW | +15 |

FIG. 26C

| TABLE NO. | AVERAGE VALUE OF PATTERN DATA READ OUT FOR YELLOW MAXIMUM DENSITY CORRECTION | YELLOW MAXIMUM DENSITY CORRECTION VALUE tsc |
|---|---|---|
| +3 | 80 AND ABOVE | -15 |
| +2 | 74~79 | -10 |
| +1 | 68~73 | -5 |
| 0 | 60~67 | 0 |
| -1 | 53~59 | +5 |
| -2 | 47~52 | +10 |
| -3 | 46 AND BELOW | +15 |

FIG. 26D

| TABLE NO. | AVERAGE VALUE OF PATTERN DATA READ OUT FOR BLACK MAXIMUM DENSITY CORRECTION | BLACK MAXIMUM DENSITY CORRECTION VALUE tsc |
|---|---|---|
| +3 | 20 AND ABOVE | -15 |
| +2 | 16~19 | -10 |
| +1 | 13~15 | -5 |
| 0 | 8~12 | 0 |
| -1 | 6~7 | +5 |
| -2 | 4~5 | +10 |
| -3 | 3 AND BELOW | +15 |

FIG. 27A

HIGHLIGHT AREA CORRECTION TABLE

| TABLE NO. | AVERAGE VALUE OF PATTERN DATA READ OUT FOR CYAN HIGHLIGHT AREA CORRECTION | CYAN MAXIMUM DENSITY CORRECTION VALUE Vspc |
|---|---|---|
| +3 | 39 AND ABOVE | +3 |
| +2 | 36~38 | +2 |
| +1 | 33~35 | +1 |
| 0 | 27~32 | 0 |
| -1 | 21~26 | -1 |
| -2 | 9~20 | -2 |
| -3 | 0~8 | -3 |

FIG. 27B

| TABLE NO. | AVERAGE VALUE OF PATTERN DATA READ OUT FOR MAGENTA HIGHLIGHT AREA CORRECTION | MAGENTA MAXIMUM DENSITY CORRECTION VALUE Vspm |
|---|---|---|
| +3 | 39 AND ABOVE | +3 |
| +2 | 36~38 | +2 |
| +1 | 33~35 | +1 |
| 0 | 31~32 | 0 |
| -1 | 25~30 | -1 |
| -2 | 13~24 | -2 |
| -3 | 0~12 | -3 |

FIG. 27C

| TABLE NO. | AVERAGE VALUE OF PATTERN DATA READ OUT FOR YELLOW HIGHLIGHT AREA CORRECTION | YELLOW MAXIMUM DENSITY CORRECTION VALUE Vspy |
|---|---|---|
| +3 | 26 AND ABOVE | +3 |
| +2 | 24~25 | +2 |
| +1 | 22~23 | +1 |
| 0 | 19~21 | 0 |
| -1 | 16~18 | -1 |
| -2 | 9~15 | -2 |
| -3 | 0~8 | -3 |

FIG. 27D

| TABLE NO. | AVERAGE VALUE OF PATTERN DATA READ OUT FOR BLACK HIGHLIGHT AREA CORRECTION | BLACK MAXIMUM DENSITY CORRECTION VALUE Vspk |
|---|---|---|
| +3 | 39 AND ABOVE | +3 |
| +2 | 36~38 | +2 |
| +1 | 33~35 | +1 |
| 0 | 27~32 | 0 |
| -1 | 21~26 | -1 |
| -2 | 9~20 | -2 |
| -3 | 0~8 | -3 |

IMAGE FORMATION APPARATUS THAT ALLOWS CORRECTION OF γ CORRECTION DATA AND ADJUSTMENT METHOD THEREOF

BACKGROUND OF THE INVENTION

1. Field of the Invention

The present invention relates to an image formation apparatus and an adjustment method thereof. More particularly, the present invention relates to an image formation apparatus such as a copying machine and a printer that allows correction of γ correction data.

2. Description of the Related Art

A digital image formation apparatus such as a laser printer, a digital copying machine, and the like that drives a light source according to image data converted into a digital value for forming an image is widely used. Various digital image formation apparatuses for reproducing the so-called half tone image such as a photograph in fidelity are proposed.

Such digital image formation apparatuses employ the method of area gradation using a dither matrix, or the multi-level laser exposure method for representing the gradation tone of one printed dot by varying the pulse width or the light emission intensity of the laser to alter the laser light. A digital image formation apparatus employing a multi-level dither method which is a combination of a dither and pulse width modulation system or an intensity modulation system is also known.

According to these types of gradation methods, the image density having a gradation tone proportional to the gradient of the image data to be reproduced should be obtained in principle. However, in practice, the original density to be reproduced and the actually reproduced image density do not correspond accurately with each other due to the complicated relationship of various factors such as the photosensitive characteristics of the photoconductor, the characteristics of the toner, the used environment, and the like. These characteristics are generally referred to as γ characteristics. The γ characteristics become a critical factor in reducing the fidelity of the reproduced image particularly for half tone originals.

Therefore, γ correction is carried out to improve the fidelity of the reproduced image. The read out original density is converted using a conversion table in which predetermined data for γ correction is stored. A digital image is formed according to the converted original density wherein the original density and the image density meet a linear relationship. By generally applying γ correction, an image corresponding to the original density can be reduced in fidelity.

A conventional digital image formation apparatus that carries out the above-described γ correction provides density control by altering at least the photoconductor surface potential prior to an exposure operation or the development bias potential applied in advance to a developer unit. Also, gradation variation is compensated for by selecting a predetermined one of a plurality of γ correction conversion tables prestored with γ correction data in response to change in the gradation tone corresponding to variation in the photoconductor surface potential and development bias potential to control the amount of light of the exposure device in a non-linear manner.

In the above-described conventional digital image formation apparatus, γ correction is carried out using a predetermined number of γ correction conversion tables prepared in advance. Therefore, fine correction corresponding to change in the environment and the like cannot be applied. There was a problem that the optimum γ correction is not always applied.

The γ correction conversion table to be used must have a great amount of data corresponding to an enormous amount of combination patterns stored therein when each of the plurality of factors varies which causes change in the γ curve. A memory of a great capacity for storing the γ correction conversion table is required. In a fixed type full color copying machine, the aforementioned combination pattern becomes more versatile due to a different developing position for each color than in the case of a monochrome copying machine or an elevator type full color copying machine. An elevator type full color copying machine includes development units of appropriate colors arranged vertically to carry out development by moving the development units vertically by selectively setting one of the development units opposite the photoconductor. The development position is always the same irrespective of which color is to be developed. A fixed type full color copying machine has the development units of appropriate colors sequentially arranged around the circumference of the photoconductor. Development of each color is carried out by selectively actuating a development unit. Therefore, the development position differs from color to color.

Usage of a memory of a great capacity for storing a γ correction conversion table corresponding to the huge amount of combination patterns will increase the cost of the apparatus. Also, each combination pattern must be subjected to experiments to produce a γ correction conversion table corresponding to each combination pattern. The number of steps for the experiments carried out is significant. There was a problem that development cannot be carried out efficiently.

SUMMARY OF THE INVENTION

In view of the foregoing, an object of the present invention is to provide a copying machine that can constantly carry out optimum γ correction at high accuracy without having to use a memory of a great capacity.

In an image formation apparatus according to an aspect of the present invention, a density detection unit detects the density of each pixel in a copy of a test pattern original generated by an image forming unit. A correction mode execution unit corrects γ correction data according to the detected result. Therefore, favorable γ correction can be always carried out without using a memory of a great capacity.

Preferably, a parameter setting unit for setting an image forming parameter of the image forming unit is provided. A correction mode execution unit corrects the correction data according to the set image forming parameter and the detected result of the density detection unit. Thus, γ correction can be carried out with further accuracy.

Preferably, the test pattern original includes a colored area and a base level area. The correction mode execution unit obtains the density difference between the colored area and the base level area of the copy of the test pattern original to correct the γ correction data according to the obtained difference. Therefore, fogging in the highlight area, slope of the γ curve, and the maximum density can be stabilized to improve the accuracy of γ correction. Thus, the accuracy of γ correction is improved.

Further preferably, the test pattern original includes a gradation pattern of a single color or a plurality of colors.

The correction mode execution unit corrects the γ correction data according to the density of a plurality of areas of the gradation pattern portion of the copy of the test pattern original. Therefore, fogging in the highlight area, slope of the γ curve, and the maximum density can be stabilized to improve the accuracy of γ correction. The accuracy of γ correction is improved significantly.

According to an image formation apparatus of another aspect of the present invention, a calculation unit calculates γ correction data according to an image forming parameter set by the parameter setting unit and a calculation coefficient. The density detection unit detects the density of each pixel in a copy of the test pattern original generated by the image forming unit. The correction mode execution unit corrects the calculation coefficient used by the calculation unit according to the detected result. Therefore, favorable γ correction can always be carried out without usage of a memory of a large capacity.

According to an adjustment method of an image formation apparatus of the present invention, a copy of a test pattern original is generated. The image density of each pixel of that test pattern original copy is detected. The γ correction data is corrected according to the detected image density. Therefore, favorable γ correction can always be carried out without usage of a memory of a large capacity.

Preferably, a test pattern original including a colored area and a base level area is used. The density difference between the colored area and the base level area of the test pattern original copy is obtained. γ correction data is corrected according to the difference in density. Therefore, fogging at the highlight area, slope of the γ curve, and the maximum density can be stabilized to improve the accuracy of γ correction.

Further preferably, a test pattern original including a gradation pattern of a single color or a plurality of colors is used. The γ correction data is corrected according to the density of the plurality of areas of the gradation pattern area of the test pattern original copy. Therefore, fogging at the highlight area, slope of the γ curve, and the maximum density can be stabilized to improve the accuracy of γ correction significantly.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 10 shows the sensitivity characteristics of a photoconductor when power is turned on.

FIGS. 26A–26D show correction tables for the high density area.

FIGS. 27A–27D show correction tables for the highlight area.

DESCRIPTION OF THE PREFERRED EMBODIMENTS

Figure 1:
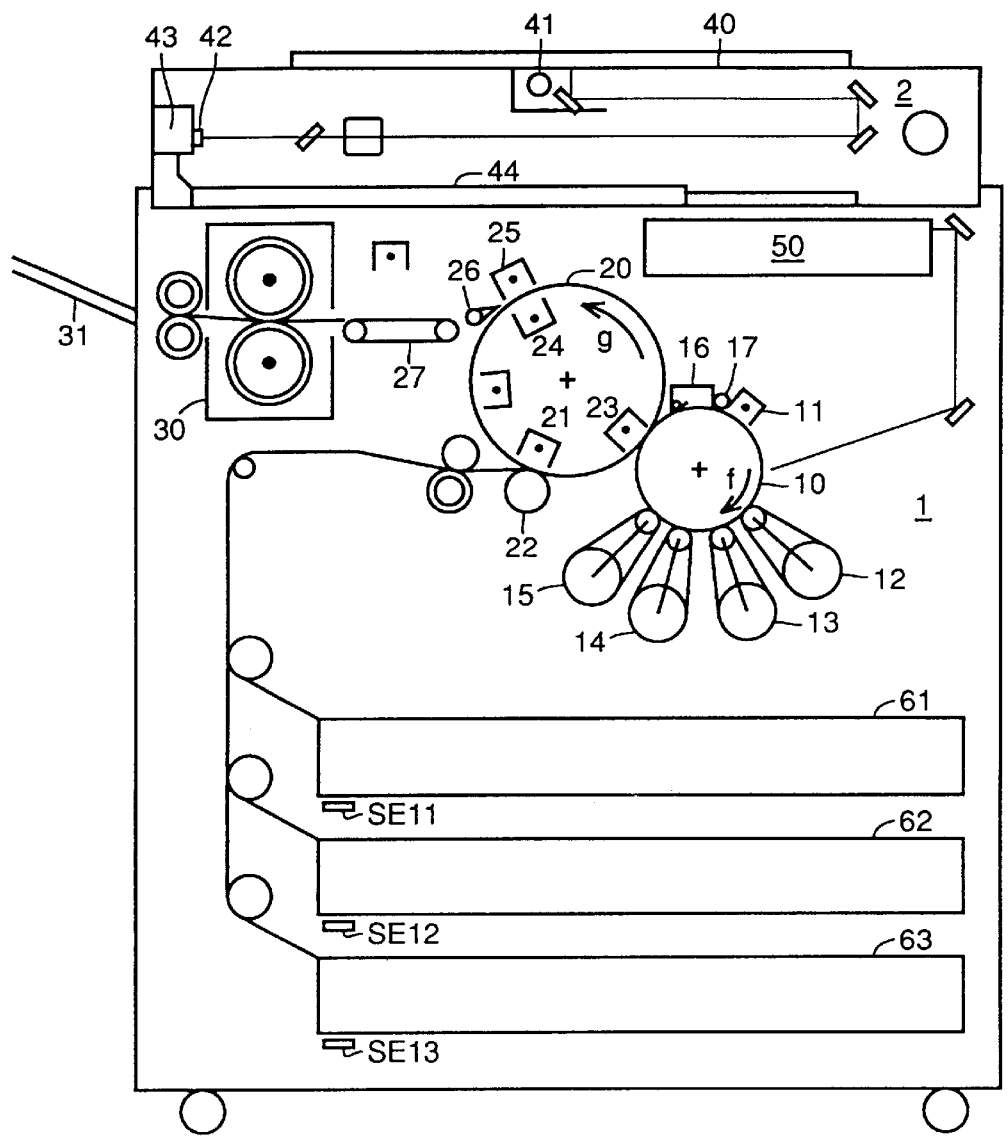
FIG. 1 is a sectional view of an entire structure of a digital copying machine according to a first embodiment of the present invention.

FIG. 1 shows the entire structure of a digital full color copying machine according to a first embodiment of the present invention. Referring to FIG. 1, the digital copying machine includes an image reader unit 2 for reading out an original image, and a printer unit 1 for reproducing the read out image.

In image reader unit 2, an original placed on a platen 40 is exposed by a scanner 41. The reflected light thereof is sensed by a reader optical unit 43 including a CCD sensor 42. The reflected light is read as a multi-level electric signal of the 3 colors of R, G, and B for each pixel by photoelectric conversion. This multi-level electric signal is applied to an image signal processing unit 44 as analog data of the reflectance.

Figure 2:
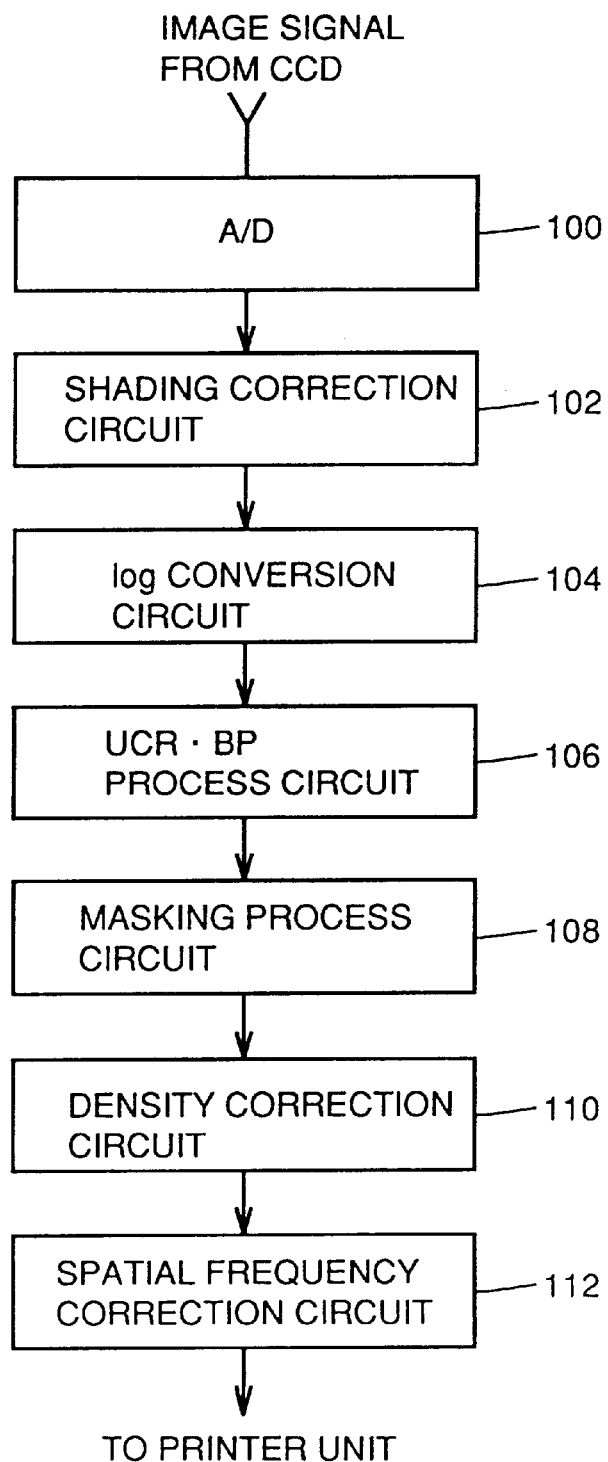
FIG. 2 is a block diagram showing a structure of an image signal processing unit of the digital copying machine of FIG. 1.

FIG. 2 is a block diagram showing a structure of image signal processing unit 44. The process flow of an image signal from CCD sensor 42 to printer unit 1 via image signal processing unit 44 will be described with reference to FIG. 2. In image signal processing unit 44, reflectance data of R, G, and B, respectively from CCD sensor 42 subjected to offset and gain corrections is converted into a multi-level digital value by an A/D converter 100. The converted value is subjected to shading correction in a shading correction unit 102. The corrected digital value is converted into density data by a log conversion circuit 104. By an under color removal•black print circuit 106, the common area of the three colors of data is calculated as black data, and the black data is subtracted from the data of the three colors to improve the reproducibility of black. In a masking processing circuit 108, the R, G, and B data are converted into signals of Y, M, C, and Bk. In a density correction circuit 110, the density is corrected by multiplying the data of Y, M, C, and Bk by a predetermined coefficient. A spatial frequency correction circuit 112 applies a smoothing operation on the data. The processed data is sent to printer unit 1 as print data.

Returning to FIG. 1, a photoconductor drum 10 is installed slightly rightwards of the center in printer unit 1. Photoconductor drum 10 can be rotatably driven in the direction of arrow f. A transfer drum 20 is installed in the vicinity of photoconductor drum 10. Transfer drum 20 is driven rotatably in the direction of arrow g. Also, a corona charger 11, magnetic brush type development devices 12–15, a transfer charger 23, a cleaning device 16 for residual toner, and an eraser lamp 17 are sequentially disposed around photoconductor drum 10. An image is projected on photoconductor drum 10 by a print head unit 50 right after the charging process. Sheet attachment chargers 24 and 25, and a detach claw 26 are disposed around transfer drum 20.

In print head unit 50, gradation tone correction, i.e. $\gamma$ correction corresponding to the image reproducibility such as the photoconductor and development characteristics is applied on the input signal. The signal is D/A converted to generate exposure data. The laser is driven in print head unit 50 according to this exposure data to expose rotated photoconductor drum 10. Photoconductor drum 10 is irradiated with erasure lamp 17 prior to this exposure and charged by corona charger 11. Upon exposure under this state, an electrostatic latent image of the original is formed on photoconductor drum 10. A 2-component developer formed of toner and carrier is stored in development devices 12–15 which are located facing photoconductor drum 10. The electrostatic latent image is converted into a visible image by the toner of a corresponding color.

In printer unit 1, three stages of automatic sheet feed units 61, 62 and 63 are provided. The size of sheets accommodated in each unit is detected by respective sensors SE11–SE13. The sheet fed out from automatic sheet feed units 61, 62 and 63 is forwarded so as to be in synchronization with an attachment position on transfer drum 20. The sheet is attracted electrostatically on a transfer film by sheet attraction roller 22 and sheet attraction charger 21. The developed image on photoconductor drum 10 is transferred onto the sheet attracted on transfer drum 20 by transfer charger 23.

The above-described operation of image reading, latent image formation, development, and transfer processes is repeated for the required number of colors (generally 4 times for a full color image formation). Then, the sheet is detached from transfer drum 20 by separation chargers 24 and 25 and detachment claw 26 to be forwarded to a fixing unit 30 through a transportation device 27. The toner image is heat-fixed on the sheet. Then, the sheet is output to a discharge tray 31.

Figure 3:
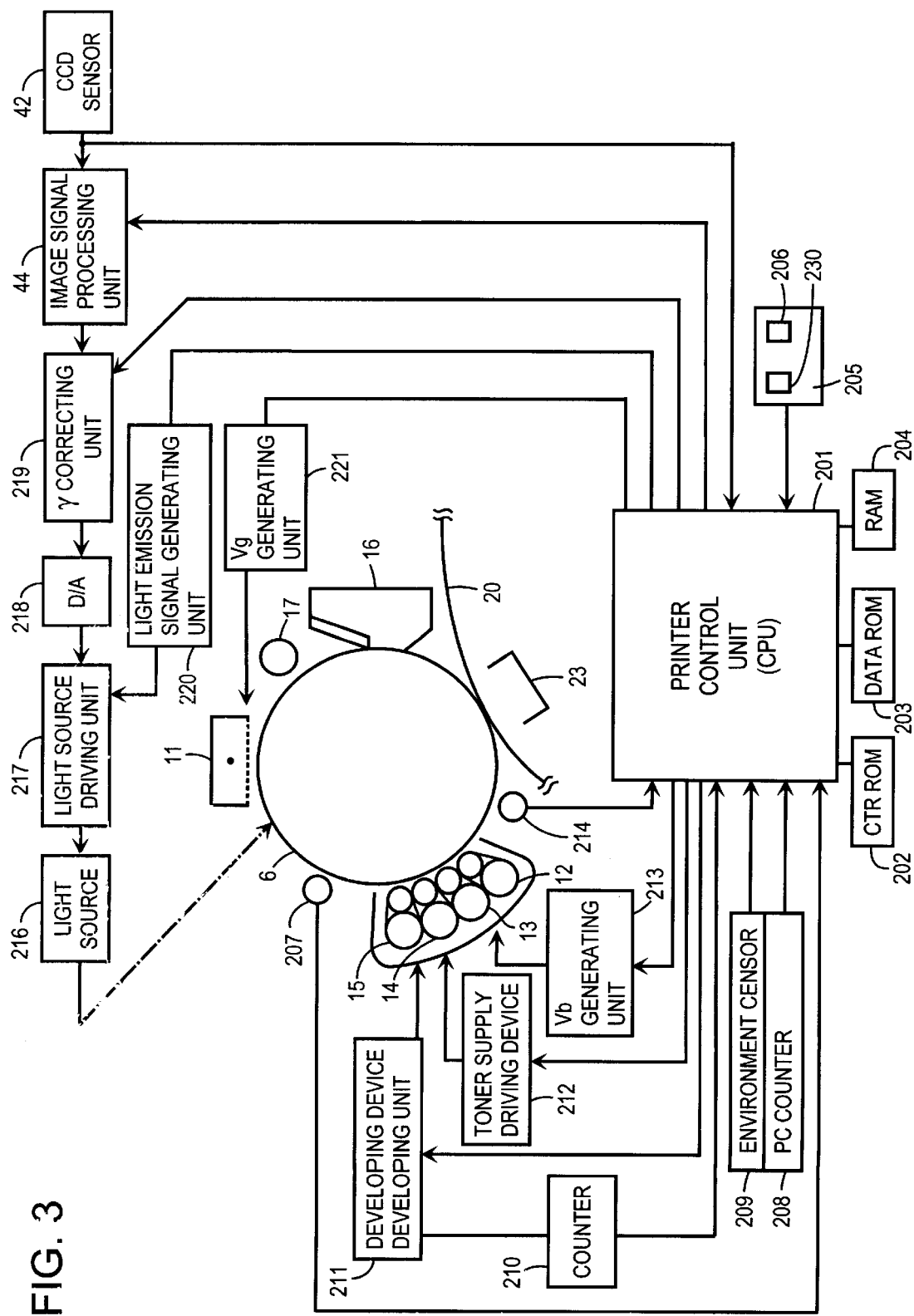
FIG. 3 is a block diagram showing a structure of a printer control system of the digital copying machine of FIG. 1.

Referring to FIG. 3, the digital copying machine further includes a printer control unit 201, a control ROM (Read Only Memory) 202, a data ROM 203, a RAM (Random Access Memory) 204, an operation panel 205 with a reset button 206 and a mode set key 230, a V sensor (surface potential sensor) 207, a photoconductor drive counter 208, an environment sensor 209, a development device drive counter 210, a development device drive circuit 211, a toner supply drive device 212, a Vb generation unit 213, an AIDC sensor (density sensor) 214, a light source 216, a light source driving unit 217, a D/A conversion circuit 218, a $\gamma$ correction unit 219, a light emission signal generation circuit 220, and a Vg generation unit 221.

Control ROM 202, data ROM 203, and RAM 204 are connected to printer control unit 201. Various programs for control are stored in control ROM 202. Various data required for automatic density control and $\gamma$ correction control that are described afterwards are stored in data ROM 203. Printer control unit 201 provides control of a print operation according to various data stored in control ROM 202, data ROM 203, and RAM 204, as well as automatic density control and $\gamma$ correction control, and the like.

Operation panel 205, photoconductor drive counter 208, and environment sensor 209 are respectively connected to printer control unit 201. AIDC sensor 214, development device drive counter 210, and V sensor 207 are also connected to printer control unit 201. Various operation instructions are entered from operation panel 205 to printer control unit 201. Furthermore, a reset signal from reset button 206, a test pattern read out mode instruction via mode set key 230, a detection signal of the surface potential of photoconductor 10 from V sensor 207, a detection signal that is an optical detection of the amount of toner adhering to the surface of photoconductor 10 via AIDC sensor 214, a signal indicating the driven number of times of photoconductor 10 via photoconductor drive counter 208, a signal indicating environment characteristics such as temperature, humidity, and the like via environment sensor 209, a signal indicating the driven number of times of development devices 12–15 via development device drive counter 210, and reflectance data via CCD sensor 42 are applied to printer control unit 201.

In order to carry out automatic density control and $\gamma$ correction control according to the above-mentioned input information, printer control unit 201 provides control to Vg generation unit 221 generating a grid potential Vg of corona charger 8, and a Vb generation unit 213 generating development bias potential Vb of each of development devices 12–15. Printer control unit 201 provides light emission data for $\gamma$ correction calculated by a predetermined process that will be described afterwards to $\gamma$ correction unit 219. $\gamma$ correction unit 219 applies $\gamma$ correction on the image data of 8 bits output from image signal processing unit 44 according to the input $\gamma$ correction light emission data. The corrected image data is converted into an analog signal by D/A conversion circuit 218 to be provided to light source driving unit 217. Light source drive unit 217 turns on light source 216 responsive to an input analog signal under control of light emission signal generation circuit 220 that is controlled by printer control unit 201. Printer control unit 201 corrects the $\gamma$ correction calculation coefficient according to the reflectance data from CCD sensor 42 in a test pattern read out mode.

The above-described digital copying machine of the present embodiment provides $\gamma$ correction control (image density stabilization control) by calculating light emission data for $\gamma$ correction used in $\gamma$-correcting image data within the apparatus. According to the present embodiment, sensing is carried out by a multi-point input of the V sensor and the AIDC sensor to calculate and produce $\gamma$ correction light emission data for each image formation operation. The coefficient for γ correction calculation is corrected in a test pattern read out mode in the present embodiment. Control of γ correction of the present embodiment will be described in detail hereinafter with reference to flow charts.

Figure 4:
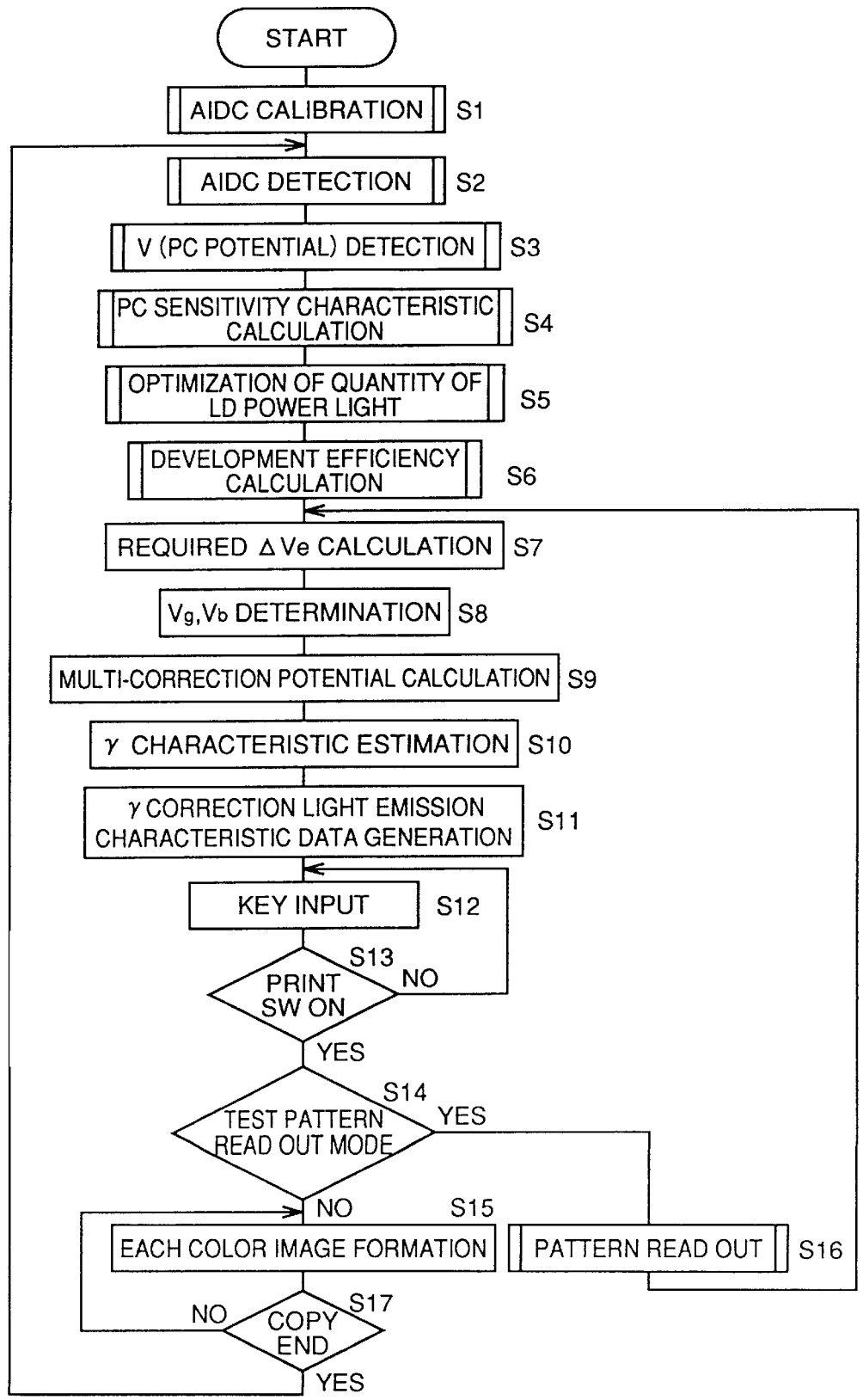
FIG. 4 is a main flow chart of the printer control system of the digital copying machine of FIG. 1.

FIG. 4 is the main flow chart of the printer control system of the digital copying machine shown in FIG. 1. When the power of the digital copying machine is turned on, first an AIDC calibration process is carried out at step S1.

Figure 5:
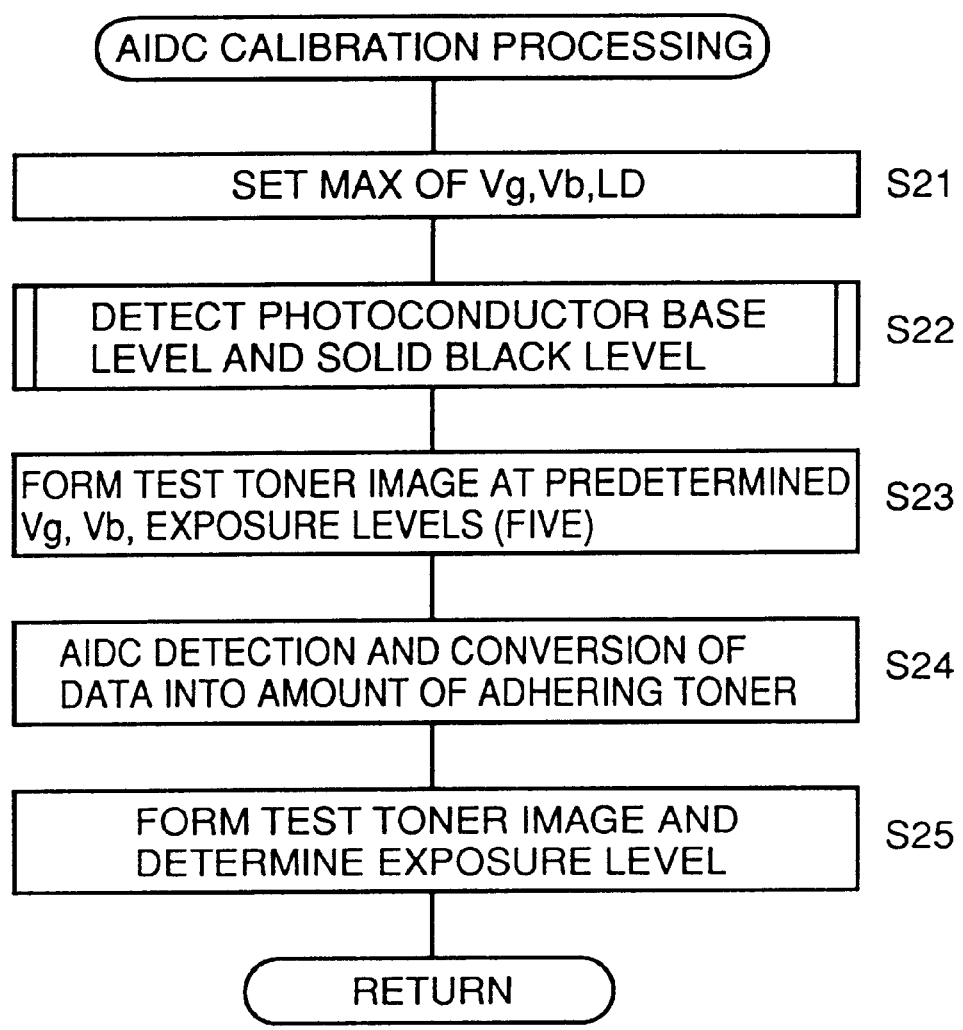
FIG. 5 is a flow chart for describing an AIDC calibration process.

The AIDC calibration process will be described in detail with reference to the flow chart of FIG. 5.

At step S21, the maximum outputs are set for each of grid potential Vg, development bias potential Vb, and exposure amount LD to obtain an output Vab of AIDC sensor 214 at the solid level where the amount of adhering toner is maximum.

At step S22, the photoconductor base level and solid level detection process is carried out. A test toner image is formed under the conditions set at step S21 to detect the current output Vab of AIDC sensor 214 together with output Van of AIDC sensor 214 at the photoconductor base level where there is no toner image. Then, the relationship between the sensor output and the amount of toner adherence (output characteristics of AIDC sensor) is standardized according to the detected outputs to be stored in RAM 204. At step S23, 5 types of test toner images for each color, i.e. for two colors are produced according to predetermined grid potential Vg and development bias potential Vb, and 5 different steps of the exposure. As to the exposure level, test toner images are formed for the five gradation levels of 1 (thirty second gradation level), 3 (sixty fourth gradation level), 5 (ninety sixth gradation level), 9 (160th gradation level), and 10 (192nd gradation level) from the twelve steps of the exposure shown in FIG. 6.

At step S24, output Vab of AIDC sensor 214 corresponding to a test toner image produced for each color is detected. The toner adherence amount is obtained from the relationship between the sensor output produced at step S22 for the detected output Vab and output Van of AIDC sensor 214 corresponding to the base level, and the adherence amount.

Figures 6, 7:
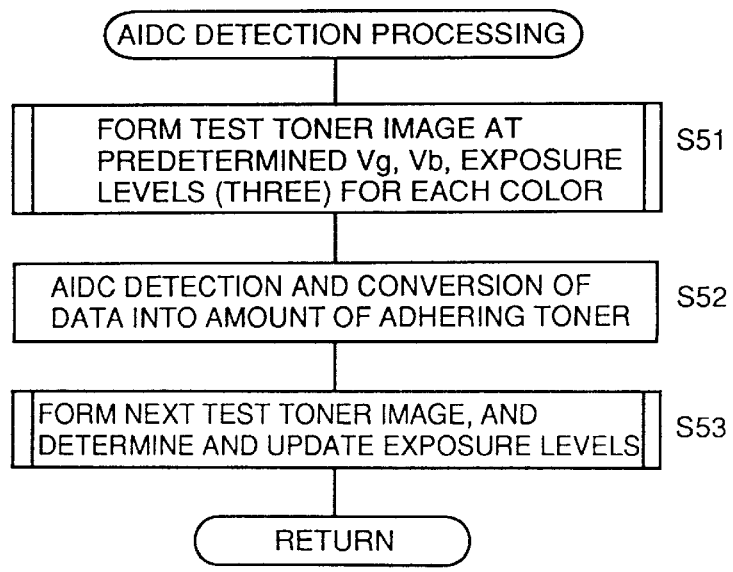
FIG. 6 is a diagram showing the relationship between an exposure step and exposure level.
FIG. 7 is a flow chart for describing an AIDC detection process.

At step S25, the three exposure levels in which the adherence amount is within the region of 0.05 mg/cm$^2$ to 0.5 mg/cm$^2$ for each color are selected from FIG. 6 according to the toner adherence amount obtained at step S24. The three exposure levels are stored.

The reason why the exposure level is selected so that the toner adherence amount is within the above-described range is set forth in the following. The regular reflection light component on the surface of photoconductor 10 is reduced as the amount of toner adherence increases to result in a lower output of AIDC sensor 214. The detection sensitivity of the sensor is also degraded. When the amount of adhering toner exceeds a certain amount, the output of AIDC sensor 214 will be completely saturated. Therefore, in order to improve the detection accuracy of the sensor, a region where the toner adherence amount is 0.05 mg/cm$^2$ to 0.5 mg/cm$^2$ is preferred in the present embodiment.

Referring to FIG. 4 again, an AIDC detection process is carried out at step S2 after the AIDC calibration process. The AIDC detection process is a subroutine for obtaining the toner adherence amount using AIDC sensor 214.

First, 12 test toner images of 3 steps of exposure level ×4 colors are produced under a predetermined grid potential Vg and development bias potential Vb. The three steps of the exposure levels are the three exposure levels selected at step S25. The amount of toner adherence of each produced test toner image is detected using AIDC sensor 214. More specifically, the amount of toner adherence corresponding to the output of AIDC sensor 214 is obtained on the basis of the output characteristics of AIDC sensor 214 obtained at the above step S22.

The AIDC detection process will be described in further detail with reference to the flow chart of FIG. 7.

At step S51, three test toner images (a test toner image M1 of a low density side, a test toner image M2 of an intermediate density level, a test toner image M3 of a higher density side) are formed on photoconductor 10 for each color under the conditions of a predetermined grid potential Vg (potential identical to that of step S23), development bias potential Vb (potential switched for each color according to estimated darkness decrement ratio), and the three steps of exposure levels selected at step S25.

At step S52, the density of a test toner image is detected by AIDC sensor 214 provided in the proximity of photoconductor 10. A process similar to that of step S1 is applied on the detected output value Va for each color. The output characteristics of AIDC sensor 214 stored at step S22 are read out from RAM 204. Output Va of AIDC sensor 214 is converted into the value of the toner adherence amount.

At step S53, determination and update of the exposure level of the next test toner image output are carried out according to the result of step S52. More specifically, the three steps of exposure level for the test toner image produced at step S51 are thereafter determined by the data set and updated at step S53 for each color. This means that the control does not return to step S1 to carry out an AIDC calibration process after a copy operation. The control returns to the AIDC detection process of step S2 to determine the three steps of exposure levels for the next operation in detecting a normal test toner of step S2.

Referring to FIG. 4 again, a V (photoconductor surface potential) detection process is carried out at step S3. In this process, the surface potential of photoconductor 10 is detected using V sensor 207. More specifically, a latent image pattern (test pattern) is produced at ten steps of exposure levels (differing from the exposure level steps of FIG. 6) under the conditions of predetermined exposure and grid potential Vg. The surface potential of each latent image pattern formed on photoconductor 10 is detected by V sensor 207. To improve the detection accuracy of the surface potential, the exposure amount and grid potential Vg are switched in 3 stages at the time of power on to form a latent image pattern at 10 steps of the exposure level to detect the surface potential at 3×10 points. When the power is turned on, the surface of photoconductor 10 is erased by erasure lamp 17 after detecting the surface potential at 3×10 points. Then, the surface potential Vr after erasure is detected. At other time points, surface potential Vr of the erased photoconductor 10 is detected after detecting the surface potential of 10 points. Although the surface potential is detected with V sensor 207 in the present process, the surface potential can be directly estimated by a predetermined calculation instead of the above-described direct detection.

The detection operation is completed by the above-described steps S1–S3. The control then proceeds to the execution of a calculation process.

Figure 8:
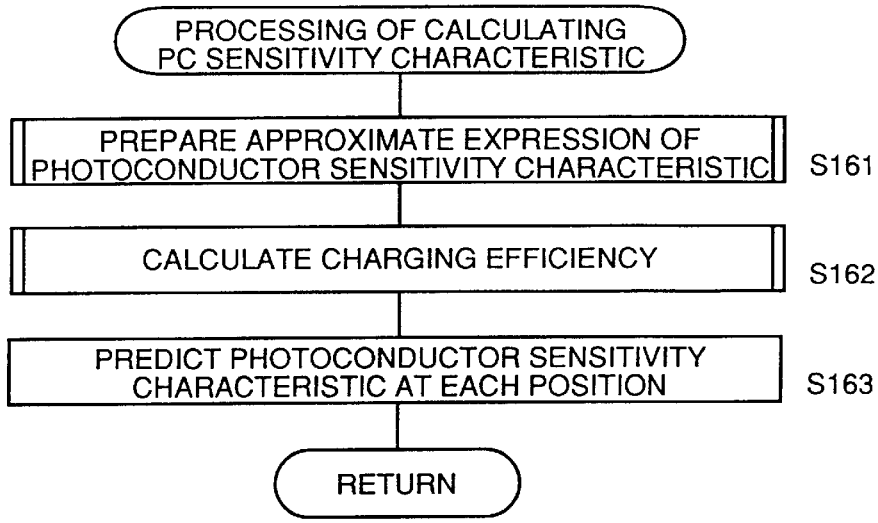
FIG. 8 is a flow chart for describing a photoconductor sensitivity characteristic calculation process.

The photoconductor sensitivity characteristic calculation process of step S4 of FIG. 4 will be described in details with reference to the flow chart of FIG. 8. At step S161, an approximate expression of the sensitivity characteristics of photoconductor 10 is produced. At step S162, a charging efficiency calculation process is executed. At step S163, the estimation process at each position of the photoconductor sensitivity characteristic is carried out. Then, the control proceeds to step S5.

Figure 9:
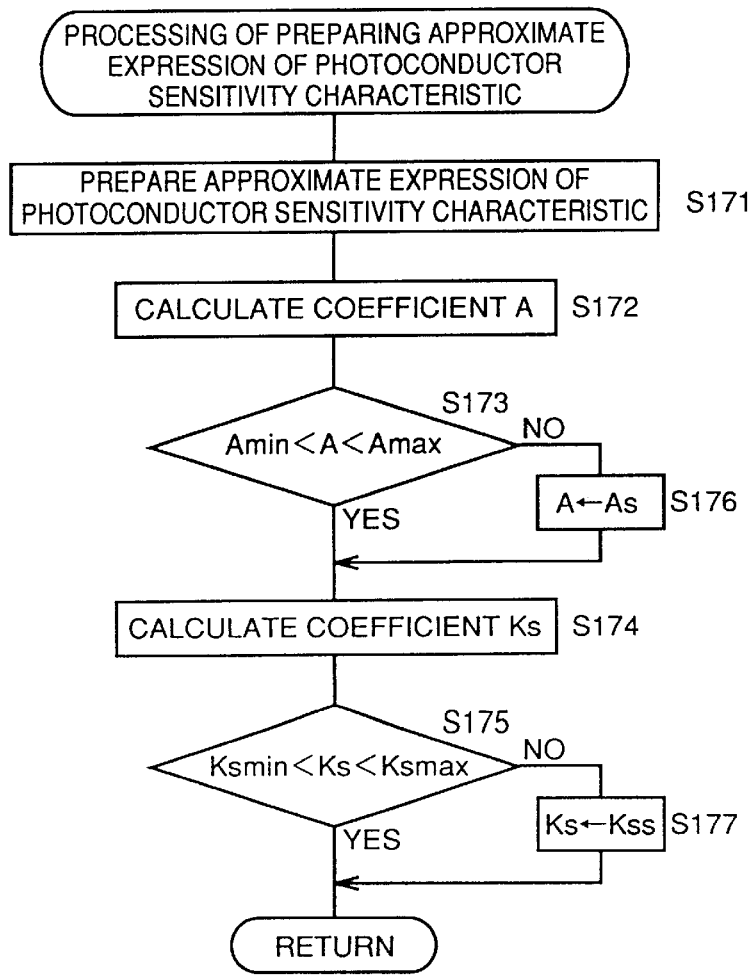
FIG. 9 is a flow chart for describing an approximate expression generation process of photoconductor sensitivity characteristics.

The process of producing an approximate expression of the sensitivity characteristics of photoconductor 10 will be described in further detail with reference to the flow chart of FIG. 9.

At step S171, the sensitivity characteristic of photoconductor 10 is calculated. More specifically, a brightness decrement curve of photoconductor 10 is approximated using the surface potential data of photoconductor 10 with respect to the 10 levels of latent image patterns detected at the above step S3. The photoconductor brightness decrement curve can be approximated by the format of $V \times e^{a*x+b}$ since it has simple decay characteristics. Each coefficient is obtained by the least squares method.

The method of producing an approximate expression of the photoconductor brightness decrement curve will be described hereinafter. According to surface potential V of photoconductor 10 detected by the detection data of step S3, approximation is carried out in a form including exposure ripple to allow calculation of the effective development potential. More specifically, assuming that the value detected by an electrometer is the average potential by the exposure ripple, the factors of the approximate expression shown below are obtained by the least squares method in the form of an average potential of the maximal value and minimum value of the ripple.

$$V = (Vbi - Vr) \times (e^{(-B*E(n)*D/Ks)} + e^{(-A*E(n)*D/Ks)})/2 + Vr \quad (1)$$

$$B = 2 - A + 0.18 \times (A-1)^3 \quad (2)$$

Vbi: surface potential under bias exposure ($\neq V_0$)

Vr: residue potential

E(n): subtraction of bias amount of light from average exposure amount (modulation exposure in each gradation)

A: maximum value under average exposure (coefficient)

B: minimum value under average exposure (coefficient)

Ks: sensitivity coefficient of photoconductor

D: ratio of exposure turn on to modulation time n: gradation for test patterns (n=1~10)

The sign of "*" indicates multiplication in the exponent. In the present embodiment, a semiconductor laser (laser diode) is used as the light source for image writing. In order to improve the response of light emission of the laser diode, a bias current is constantly applied, whereby the laser diode emits light spontaneously. Therefore, the above Vbi indicates the photoconductor surface potential under exposure by spontaneous light emission.

In the above approximate expression, surface potential Vbi under bias exposure is set as the initial value for attenuation according to the facility and reliability of detection. The surface potential V of photoconductor 10 at an arbitrary grid potential Vg and exposure amount under the actual usage environment can be calculated using the coefficients obtained by the above approximate expression.

In order to obtain the coefficients of A, B, and Ks using the least squares method, first it is necessary to determine the initial value. Initial value Ks0 of Ks is determined by the following equation.

$$Ks0 = \frac{1}{12} \sum_{m=0}^{2} \sum_{n=0}^{4} \left\{ \frac{E(n,m) \times D - E(0)}{\ln\left(\frac{Vs(n,m) - Vr}{Vbi - Vr}\right)} \right\} \quad (3)$$

Vs(n): average surface potential (detection potential of each gradation)

m: grid potential Vg of corona charger 1.4 is used as the initial value of A.

Figure 10:
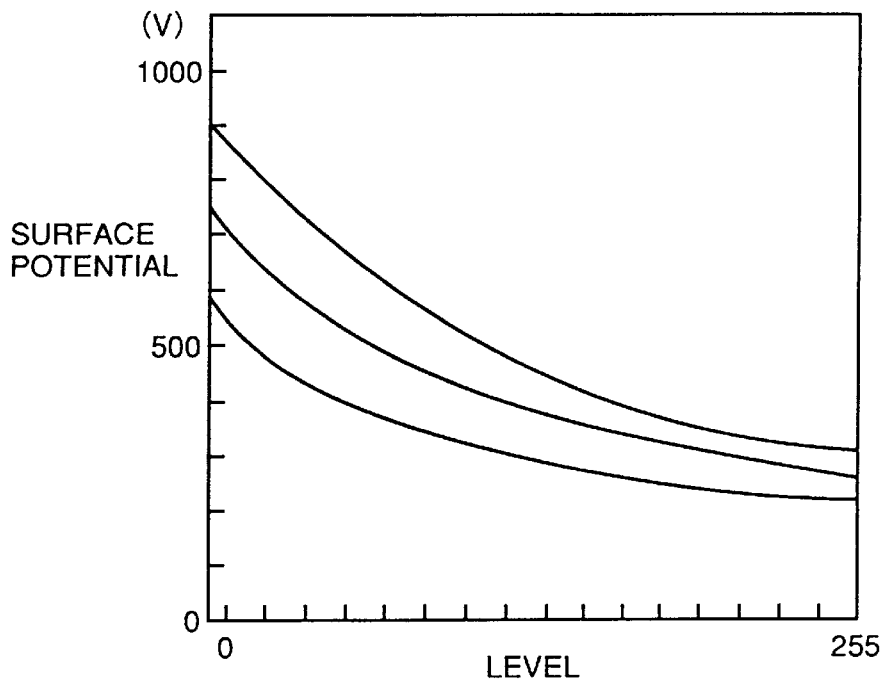

According to the above process, the surface potential of photoconductor 10 is detected switching the exposure amount and grid potential Vg 3 times when power is turned on. Therefore, 3 brightness decay curves of the photoconductor, i.e. three sensitivity characteristic curves of photoconductor 10 are produced. FIG. 10 shows the sensitivity characteristics of photoconductor 10 when power is turned on. At all times other than when power is turned on, one photoconductor sensitivity characteristic curve is produced since the surface potential is detected only once. Ks and A obtained by the above process are coefficients to obtain the photoconductor surface potential at the position of V sensor 207. Therefore, these coefficients are indicated as Ksv and Av in the following description.

Referring to FIG. 9 again, coefficient A is calculated at step S172 as described above. At step S173, determination is made whether coefficient A is between maximum value Amax and minimum value Amin that are determined in advance. When coefficient A is between Amin and Amax, control proceeds to step S174, otherwise to step S176. At step S176, coefficient A is modified to a predetermined value As. The previous calculated coefficient A or a predetermined set value is used as As.

At step S174, coefficient Ks is calculated as described above. At step S175, determination is made whether coefficient Ks is between minimum value Ksmin and maximum value Ksmax that are determined in advance. When coefficient Ks is within this range, control proceeds to step S162, otherwise to step S177. At step S177, coefficient Ks is modified to a predetermined value Kss. The previous calculated coefficient Ks or a predetermined set value is used as Kss.

Comparison with the prior calculated result or with the initial set value is made. When the difference or ratio exceeds the set threshold value, the current value is regarded to be irregular. The previous calculated result or initial set value is employed, and control proceeds to the next stage. When the calculated result of an irregular value continues for more than a predetermined number of times with respect to the set threshold value, a display can be provided indicating that any of photoconductor 10, corona charger 11, Vg generation unit 221 and V sensor 207 is defective. The above calculated result can be reset automatically by exchanging photoconductor 10, the developer, AIDC sensor 214, V sensor 207, and the like, or by reset button 206.

Figure 11:
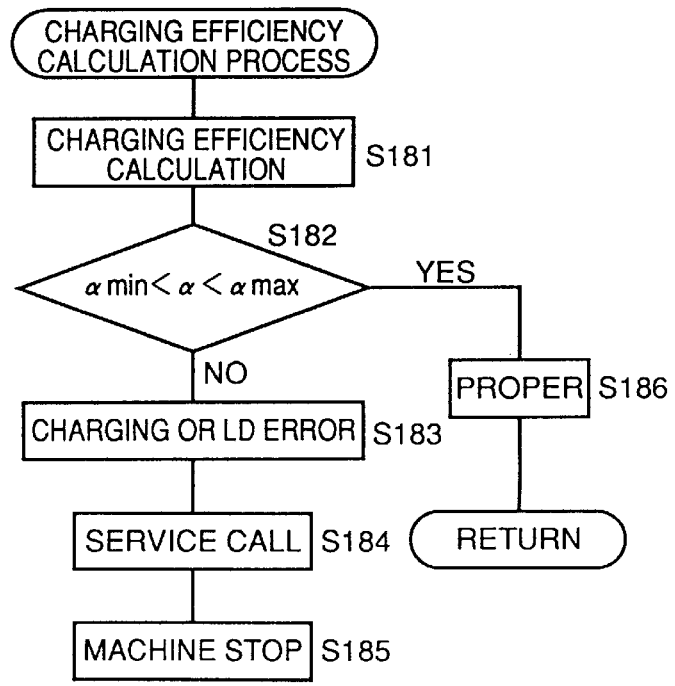
FIG. 11 is a flow chart for describing a charging efficiency calculation process.
Figure 12:
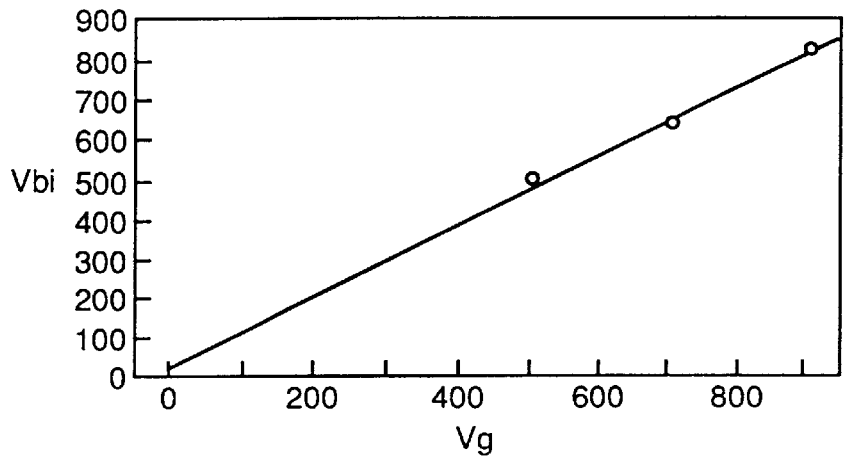
FIG. 12 shows the relationship between surface potential and grid potential.

The charging efficiency calculation process will be described in detail with reference to the flow chart of FIG. 11. At step S181, the charging efficiency calculation process is carried out. More specifically, charging efficiency of photoconductor 10 is calculated using the surface potential detected at step S3. The charging efficiency is required to calculate grid potential Vg to obtain a desired surface potential as described afterwards. The charging efficiency is obtained with the relationship of surface potential Vbi to grid potential Vg taking a linear expression. The linear function essentially includes no intercept or includes potential Vr after erasure as an intercept. However, approximation is achieved by the following equation in a form including an intercept to improve the accuracy in actual usage.

$$Vbi = \alpha \times Vg + \beta \quad (4)$$

where $\alpha$ is the charging efficiency and $\beta$ is an intercept. By the above equation, the relationship between the surface potential and grid potential shown in FIG. 20, for example, can be obtained. $\alpha$ and $\beta$ obtained by the above equation are coefficients at the position of V sensor 207. They are referred to as $\alpha v$ and $\beta v$ in the following description.

Referring to FIG. 11 again, at step S182, determination is made whether the calculated charging efficiency $\alpha$ is greater than a preset minimum value $\alpha$min and smaller than a maximum value $\alpha$max. When the calculated charging efficiency $\alpha$ is within this range, control proceeds to step S186. Charging efficiency $\alpha$ is regarded to be a proper value, and control proceeds to step S163.

When the above conditions are not satisfied, control proceeds to step S183. Determination is made that there is an error in charging or laser emission. Control proceeds to step S184 to execute a service call process. Then at step S185, the apparatus is turned down.

In the case where the data such as coefficients A, Ks, and charging efficiency $\alpha$ used to produce the emission characteristic data for $\gamma$ correction is not proper, the data can be modified to a predetermined data. Furthermore, it is possible to notify the user that maintenance is required and to turn down the machine. As a result, the event of using the apparatus in an erroneous state can be eliminated. The machine can be always used in a favorable condition.

Also, the following procedure can be taken. Comparison is made with the previous calculated result or initial set value. When the difference or ratio exceeds a set threshold value, the current value is regarded to be an irregular value. Therefore, the previous calculated result or initial set value is employed, and control proceeds to the next stage. A display can be also provided to indicate that any of photoconductor 10, corona charger 11, Vg generation unit 221, and V sensor 207 is defective when an irregular calculated result continues for more than a predetermined number of times with respect to the set threshold value. The calculated result can be reset automatically by exchanging photoconductor 10, developer agent, AIDC sensor 214, V sensor 207, and the like, or by reset button 206.

Referring to FIG. 8 again, at step S163, a photosensitivity characteristic curve of photoconductor 10 at each development position of development devices 12–15 is estimated. Each value obtained in the above process is a coefficient at the position of V sensor 207. Therefore, a coefficient at each development position is calculated by a proportional calculation with respect to the factor of the position of V sensor 207. The sensitivity characteristics of photoconductor 10 at each development position is the only value that cannot be directly calculated in the series of $\gamma$ correction control. This value is calculated according to an empirical rule.

As to the empirical rule, an analysis of variance was carried out by experiments with the environment, film thickness, sheet feed mode, pause mode, beam diameter, and the like as control factors. Those of a high contribution ratio (more than 5%) are stored in data ROM 203 as predetermined data in the format of a look up table for each control factor. Respective ratio of each development position of Av, Ksv, $\alpha v$, $\beta v$ at the position of V sensor 207 can be obtained.

Figure 13:
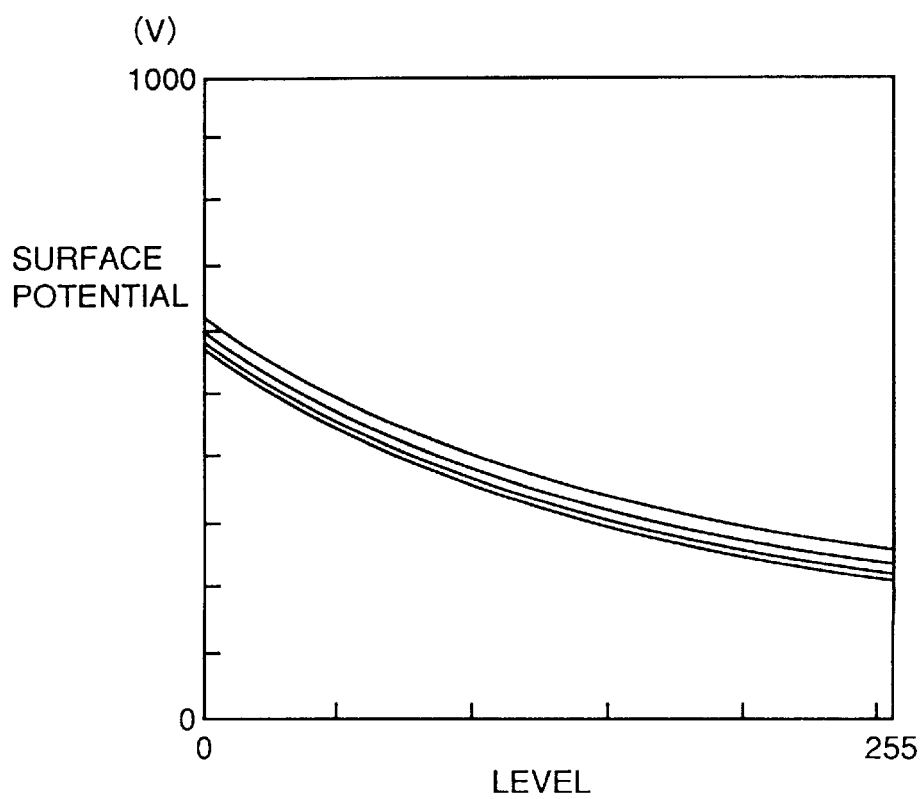
FIG. 13 shows sensitivity characteristics of a photoconductor at each development position.

FIG. 13 shows the photoconductor sensitivity characteristic at each development position obtained by the above calculation. In FIG. 13, the upmost curve shows the photoconductor sensitivity characteristic at the position of V sensor 207. The sequential curves show the photoconductor sensitivity characteristics at each development positions of development devices 12–15 in order. By obtaining each coefficient at each development position using respective factors at the position of V sensor 207, the photoconductor sensitivity characteristic at each development position can eventually be obtained.

Returning to FIG. 4, at step S5, the quantity of LD power light (maximum exposure in forming an image) is optimized. The LD power light amount can be determined in a one-to-one correspondence according to the conditions of photoconductor 10 independent of the development conditions. The quantity of LD power light Pmax(i) is determined to be approximately 2.5 times the half decay exposure Eh(i) at each development position based on the estimated photoconductor sensitivity characteristic at each development position. The above half decay exposure Eh(i) is the amount of exposure that reduces the potential of photoconductor 10 to ½ when photoconductor 10 charged by a certain potential is exposed at the exposure position and then arrives at each development position.

The quantity of LD power light is calculated according to the following expressions.

$$V = (Vbi - Vr) \times (e^{(-B(i) \cdot Eh(i) \cdot D/Ks(i))} + e^{(-A(i) \cdot Eh(i) \cdot D/Ks(i))})/2 + Vr \quad (5)$$

$$V = (Vbi - Vr)/2 + Vr \quad (6)$$

$$V = (Vbi - Vr) \times (e^{(-A(i) \cdot Eha(i) \cdot D/Ks(i))}) + Vr \quad (7)$$

$$V = (Vbi - Vr) \times (e^{(-B(i) \cdot Ehb(i) \cdot D/Ks(i))}) + Vr \quad (8)$$

$$V = (Vbi - Vr)/2 + Vr \quad (9)$$

In the above expressions, i=1 to 4 (wherein i=1, i=2, i=3, and i=4 indicate yellow developing device 12, magenta developing device 13, cyan developing device 14, and black developing device 15, respectively; Eh(1) to Eh(4) indicate the half decay exposure at each development position of yellow, magenta, cyan, and black; A(1) to A(4), B(1) to B(4), and Ks(1) to Ks(4) indicate each coefficient at each development position). The quantity of LD power light can be calculated by obtaining Eh(i) of expression (5) satisfying expression (6). In order to obtain the value of Eh(i), the values of Eha(i) and Ehb(i) of expressions (7) and (8) satisfying expression (9) are respectively found. Then, the average of these values is taken as Eh(i). Eh(i) times 2.5 is determined to be Pmax(i). More specifically, Pmax(i) is calculated according to the following expression.

$$Pmax(i) = 2.5 \times (-Ks(i)) \times \ln(\frac{1}{2}) \times (1/A(i) + 1/B(i))/2 \quad (10)$$

According to the above calculation, the quantity of LD power light Pmax(i) of approximately 2.5 times the half decay exposure at each development position (i=1 to 4) is determined.

When the system speed differs between the time of detection and image formation such as in the case of a higher system speed when a monocolor copy is made, the quantity of LD power light is determined so that the cumulative quantity of light per unit time is equivalent to the quantity of light calculated under the above condition.

Figure 14:
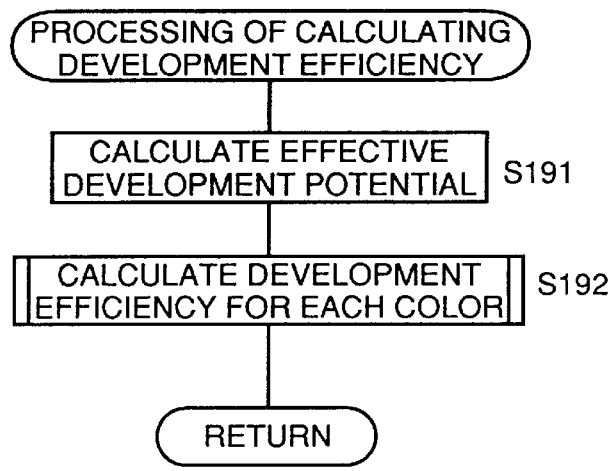
FIG. 14 is a flow chart for describing a development efficiency calculation process.

The process of calculating development efficiency of step S6 in FIG. 3 will now be described in detail with reference to the flow chart of FIG. 14. At step S191, the effective development potential calculation process is carried out.

More specifically, the effective development potentials of the test patterns of 3 gradations ×4 colors (hereinafter referred to as "AIDC pattern") formed at step S2 are obtained. In this invention, the effective development potentials are calculated by input of the condition under which the patterns are formed using the estimated photoconductor sensitivity characteristic at each development position.

First, an average development potential Ve(i, n) is calculated according to the following expression.

$$Ve(i, n) = [(Vbi(i)-Vr) \times (Ks(i))/\{(B(i)-A(i)) \times E(n)\}] \times (e^{(-B(i) \cdot E(n) \cdot D/Ks(i))} - e^{(-A(i) \cdot E(n) \cdot D/Ks(i))}) + Vr \qquad (11)$$

Then, the quantity of light C(i) satisfying V(C)=Vb +Vmg at each development position under uniform exposure is calculated according to the following expression.

$$C(i) = Ks(i) \times \ln\{(Vbi(i)-Vr)/(Vb(i)+Vmg(i)-Vr)\} \qquad (12)$$

Here, Vmg is a fog potential (development start potential) correction coefficient, having an initial value of 0.

Then, effective development potential ΔVe(i, n) of the AIDC pattern is calculated. The calculation is conducted in three cases, i.e. when the exposure ripple is sufficiently greater than development bias potential Vb, when the exposure ripple overlaps development bias potential Vb, and when the exposure ripple is sufficiently smaller than development bias potential Vb.

When (C(i)/B(i))<E(n)×D (i.e. when the ripple is sufficiently larger than Vb), ΔVe(i, n) is calculated according to the following expression.

$$\Delta Ve(i, n) = Vb(i) + Vmg(i) - Ve(i, n) \qquad (13)$$

When (C(i)/A(i))<E(n)×D<(C(i)/B(i)) (i.e. when the ripple overlaps Vb), ΔVe(i, n) is calculated according to the following expression.

$$\Delta Ve(i, n) = [-1/\{(A(i)-B(i)) \times E(n) \times D\}] \times \{Ks(i) \times (Vbi(i)-Vr) \times e^{(-A(i) \cdot E(n) \cdot D/Ks(i))} + (A(i) \times E(n) \times D - C(i) - Ks(i)) \times (Vb(i) + Vmg(i) - Vr)\} \qquad (14)$$

Lastly, when (C(i)/A(i))>E(n)×D (i.e. when the ripple is sufficiently smaller than Vb), ΔVe(i, n) is calculated according to the following expression.

$$\Delta Ve(i, n) = 0 \qquad (15)$$

Referring again to FIG. 14, the process of calculating development efficiency for each color is carried out at step S192. Then, control proceeds to step S7.

More specifically, the development efficiency is calculated from the amount of adhering toner obtained at step S2 and the above calculated effective development potential. The relationship between the amount of adhering toner and the effective development potential is approximated in a linear expression. The slope and intercept are obtained. This slope is the development efficiency. Although the intercept of the linear expression should be 0, the intercept will include some value since the fog phenomenon does not necessarily occur from the level of development bias potential Vb. Therefore, the intercept is used as a fog potential correction coefficient Vmg.

Figure 15:
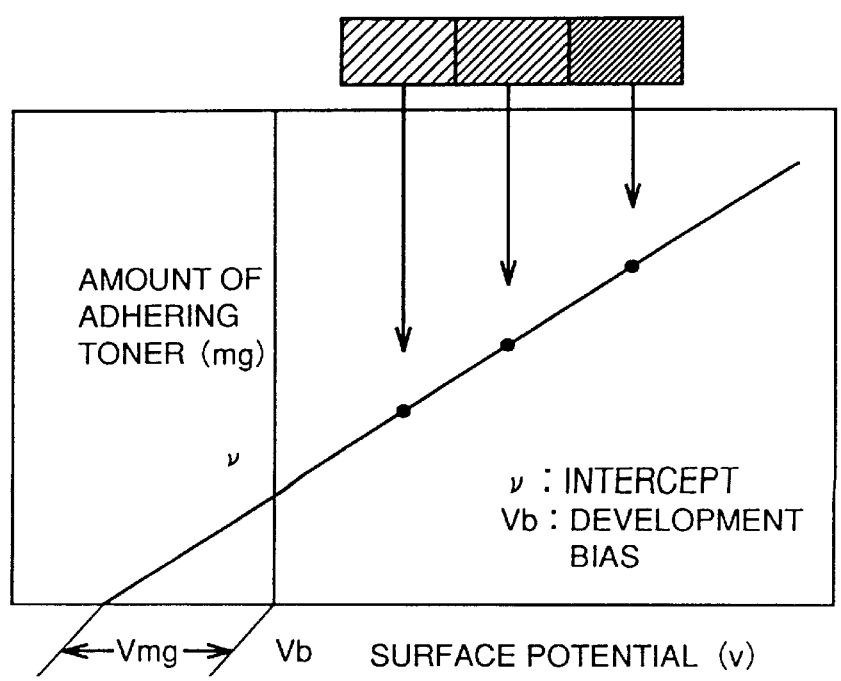
FIG. 15 shows the relationship between surface potential and the amount of toner adherence.

In practice, fog potential correction coefficient Vmg is calculated from the slope (development efficiency η(i)) and the intercept (v(i)). FIG. 15 shows the relationship between the surface potential and the amount of adhering toner. As shown in FIG. 15, fog potential correction coefficient Vmg (i) can be calculated according to the following expression.

$$Vmg(i) = v(i)/\eta(i) \qquad (16)$$

By recalculating the above described effective development potential using this obtained Vmg(i), a development efficiency can be calculated with no intercept (v(i)=0).

Referring again to FIG. 4, effective development potential ΔVe required for each color is calculated at step S7. First, a development characteristic curve is approximated. Although the development characteristic should be linear (potential and amount of adhering toner are in a linear relationship), there may be a case where the development characteristic is not linear when a large amount of toner adheres under conditions such as low temperature, low humidity, low T/C (the case where the toner content with respect to carrier is low), and the like. Therefore, at this step, the development characteristic curve for each color is approximated using the development efficiency calculated by the above described processing, with the slope at the side of a greater amount of adhering toner made less abrupt.

Then, effective development potential ΔVe required for each color in order to obtain the desired maximum amount of adhering toner (maximum density) is calculated from the quantity of LD power light obtained at step S5 and the development characteristic curve obtained by the above described process. First, the transfer characteristic is to be estimated in order to convert the desired maximum amount of adhering toner into the amount on a transfer material. The transfer characteristic is estimated as follows. Using the predetermined coefficient prestored in data ROM 203, correction is applied according to at least one of humidity information from environment sensor 209, transfer material information from operation panel 205, and counter information from developing device driving counter 210. Further, based on the environmental information from environment sensor 209, the transfer material information from operation panel 205, and the counter information from developing device driving counter 210 at that time, transfer efficiency coefficients d1, d2, and d3 for each information are read out. Then, effective development potential $\Delta Ve_{(255)}$ required for each color is calculated according to the following expression.

$$\Delta Ve_{(255)} = (0.7 + R_{0.7} \times d1 \times d2 \times d3)/\eta(i) \qquad (17)$$

At step S8, grid potential Vg and development bias potential Vb which are image forming parameters are determined. More specifically, the approximate expression of the photoconductor sensitivity characteristic at each development position obtained at step S163 of FIG. 8 is first counted back to calculate development bias potential Vb for each color for satisfying effective development potential ΔVe required for each color obtained by the above described process. At this time, the fog potential correction coefficient calculated by the above processing of calculating development efficiency is also taken into account.

A set fog margin is added to the calculated development bias potential Vb, which is set as surface potential Vbi for each color. Grid potential Vg to obtain this Vbi is calculated using the charging efficiency obtained at step S181. If either Vg or Vbi exceeds a grid potential range or a development bias potential range that can be set, a value which is closest to the set range is set. The other of Vg and Vb is recalculated according to that set value (Vb+fog margin or Vbi−fog margin).

At step S9, a potential for correction for a multi-copy operation mode is calculated. More specifically, a potential for correcting sensitivity change during the multi-copying operation is calculated. If the charging efficiency does not substantially change during the multi-copying operation, a change in the latent image forming system is considered to arise from sensitivity variation of photoconductor 10. Since the quantity of LD power light is determined by the sensitivity of the photoconductor, the sensitivity change can be corrected by being standardized with the exposure amount and potential. When the exposure and potential are to be standardized geometrically, they may be standardized with the maximum or minimum value. However, since the half tone part where the sensitivity is high has a greater impact on an image, standardization is carried out in the vicinity of the half decay exposure or at a certain gradation tone. More specifically, the quantity of LD power light is fed back so that the potential at that gradation level is always kept constant. Since the actual detection is conducted by V sensor 207, it is assumed that the potential at the development position is corrected if the potential at the position of V sensor 207 is corrected.

More specifically, in this process, a potential V1 at the time of radiation with exposure E1 is calculated according to the following expression.

$$V1=(Vbi-Vr)\times(e^{(-Bv^*E1^*D/Ksv)}+e^{(-Av^*E1^*D/Ksv)})/2+Vr \quad (18)$$

This is the potential at exposure E1 when a γ correction curve is produced.

Figure 16:
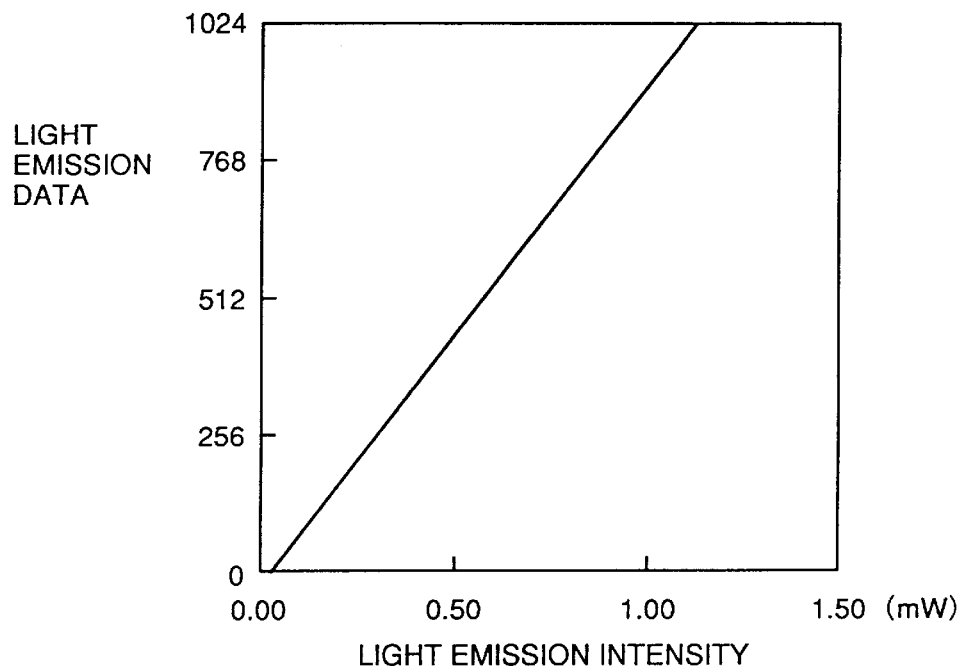
FIG. 16 shows the relationship between light emission data and light emission intensity.

Then, at step S10, the γ characteristic during linear emission is estimated. First, the quantity of light from the quantity of bias light to the set quantity of LD power light is divided into 255. In the present case, a relationship between light emission data and light emission intensity as shown in FIG. 16, for example, is obtained.

Figure 17:
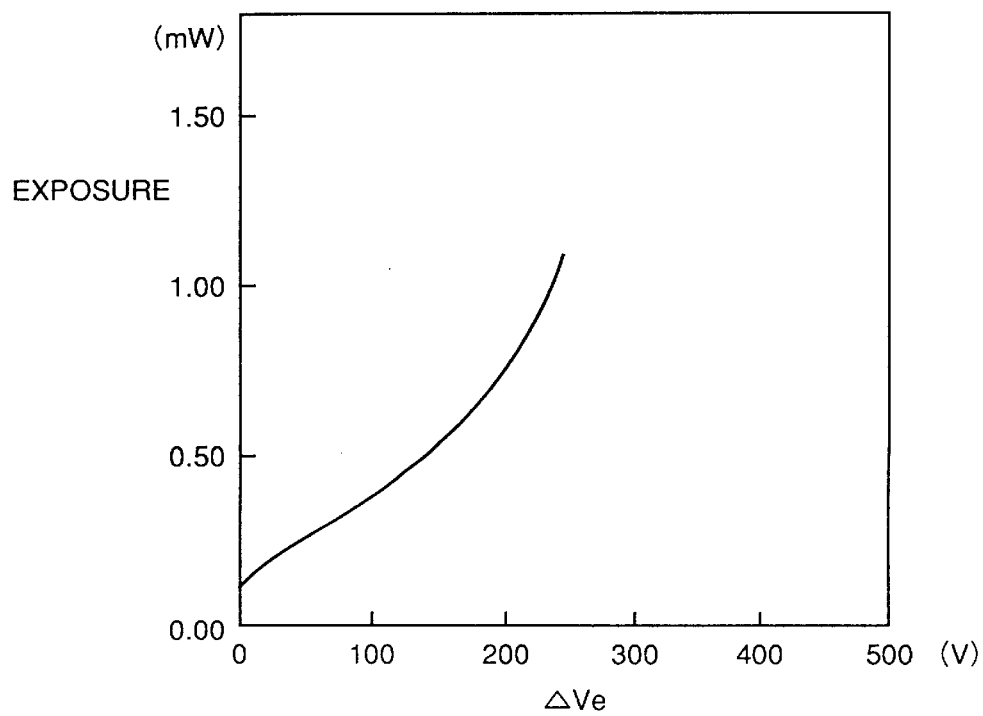
FIG. 17 shows the relationship between the amount of exposure and effective development potential.

Then, effective development potential ΔVe for each of the respective quantities of light, that is, of the above described 256 gradation levels, is calculated using the approximate expression of the photoconductor sensitivity characteristic at each development position obtained at step S4, and the set grid potential Vg, development bias potential Vb, and the fog potential correction coefficient. The relationship between the amount of exposure and effective development potentials ΔVe is as shown in, for example, FIG. 17.

Figure 18:
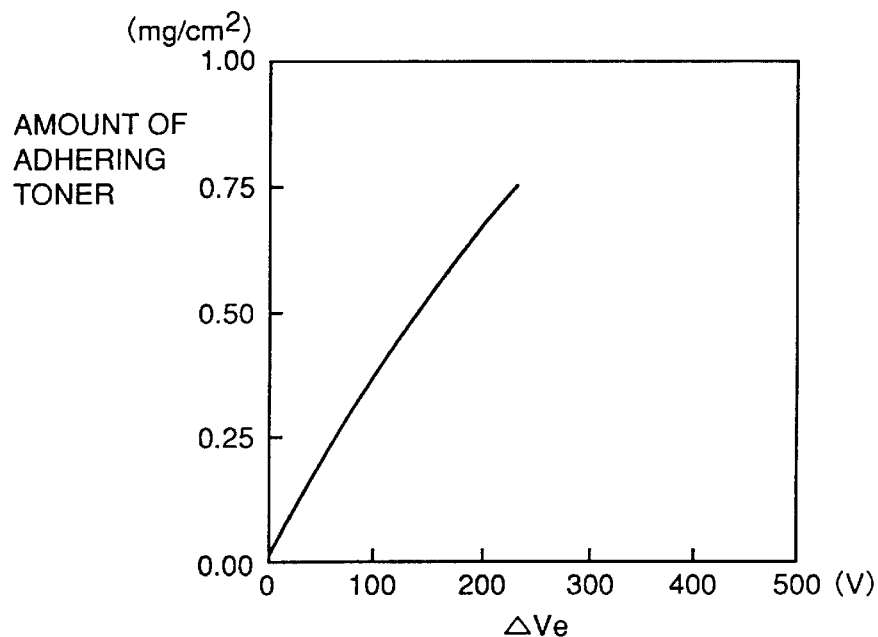
FIG. 18 shows the relationship between the amount of adherence on a photoconductor and effective development potential.

Then, the amount of adhering toner on the photoconductor are calculated for respective effective development potentials ΔVe using the development efficiency. The relationship between effective development potentials ΔVe and the amount of adhering toner on the photoconductor is as shown in, for example, FIG. 18.

Then, the amount of toner on the sheet is calculated by subtracting the estimated amount of residual toner from the respective amounts of toner adhering to the photoconductor. The estimated amount of residual toner is prestored in a look-up table, and fed back through the information of environment sensor 209. When the amount of toner adhering to a sheet is PT (n, i) and the amount of toner adhering to the photoconductor is PA (n, i), the amount of toner adhering to a sheet is given by the following expression.

$$PT(n, i)=PA(n, i)-R(n)\times d1\times d2\times d3 \quad (19)$$

Figure 19:
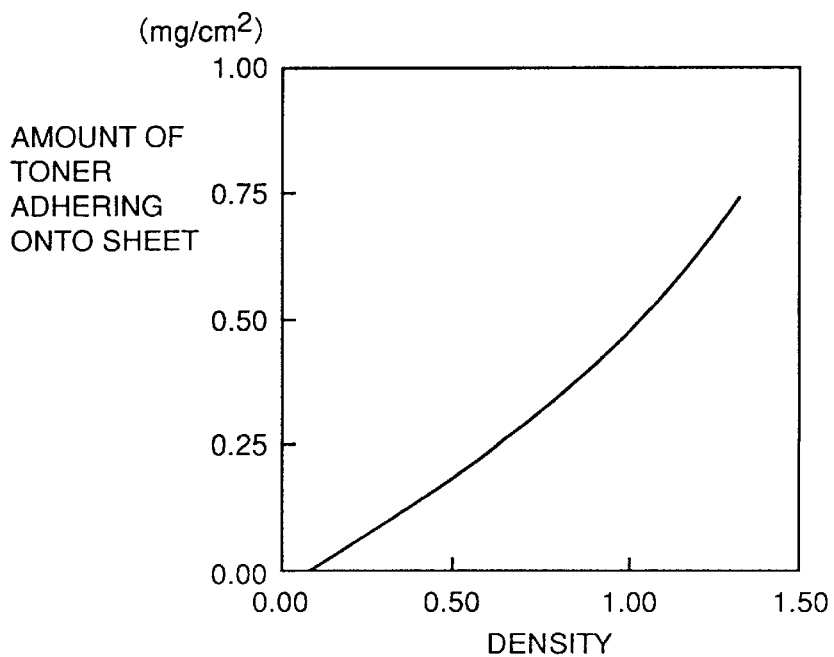
FIG. 19 shows the relationship between the amount of adherence on a sheet and density.
Figure 20:
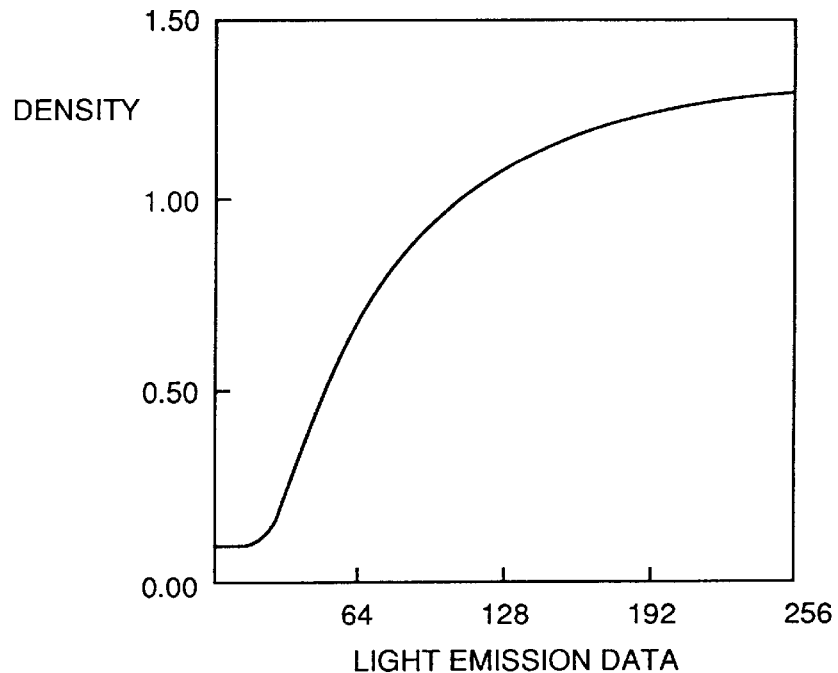
FIG. 20 shows a γ correction characteristic curve.

Then, the relationship between the amount of toner adhering to a sheet and density is obtained according to the toner characteristic. This process is carried out by using the measured characteristics prestored in a look-up table. For example, the relationship between the amount of toner adhering to a sheet and density shown in FIG. 19 is prestored. Therefore, by obtaining the density on a sheet using this look-up table, densities for 256 gradation levels can be calculated. As a result, a γ characteristic curve as shown in FIG. 20, for example, can be obtained.

At step S11, light emission characteristic data for γ correction is prepared using the γ characteristic curve obtained by the above described processes. The light emission characteristic data for γ correction can be calculated by X-Y axis conversion of the γ characteristic curve when the γ characteristic curve is rendered to be linear.

Figure 21:
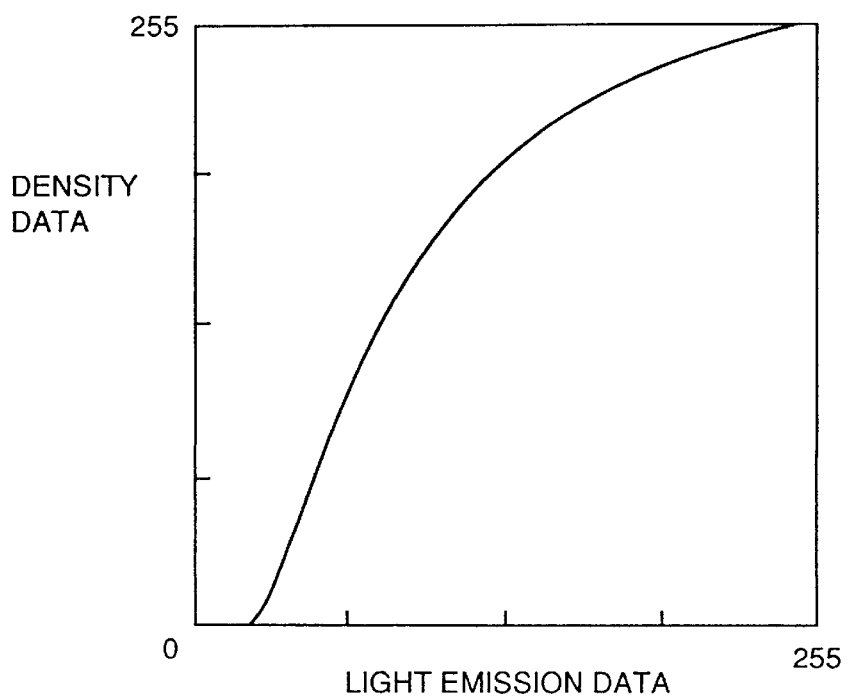
FIG. 21 shows the relationship between density data and light emission data.

The γ characteristic curve obtained at step S10 is 8-bit standardized between a target density (density of a target amount of adhering toner) and level 0. When the maximum density of the γ characteristic curve does not attain the target density, gain of standardization is adjusted according to the insufficient amount. As a result, the relationship between density data and light emission data as shown in FIG. 21, for example, is obtained.

Figure 22:
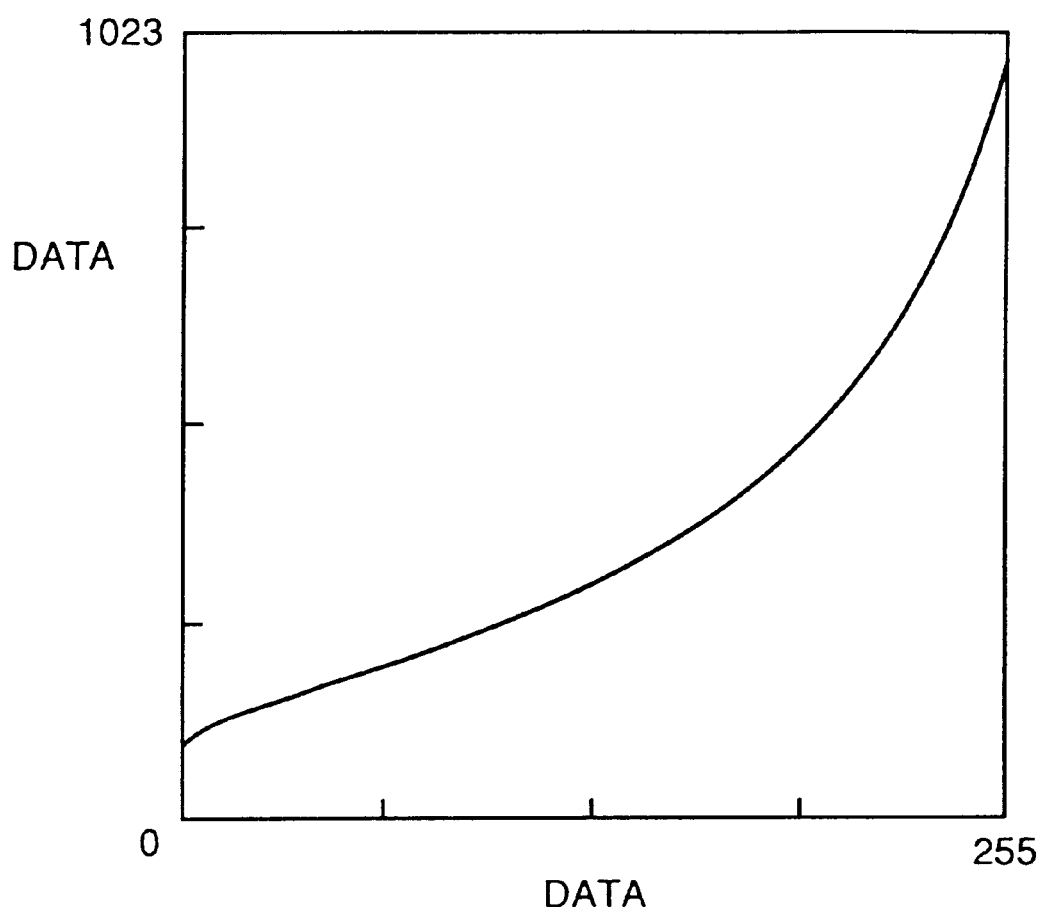
FIG. 22 shows data that is converted in the X-Y axis.

Then, 8-bit data is converted into 10-bit data (four times), which is then subjected to X-Y axis conversion. Then, the incomplete data is compensated linearly. As a result, data shown in FIG. 22 is obtained.

Finally, the data obtained is smoothed with a moving average filter. As a result, the light emission characteristic data for γ correction is obtained for converting linearly the γ characteristic curve prepared at step S10.

Thus, γ correction control is carried out as described above. Following step S11, input of various keys (including read mode set key 230 of the present invention) is carried out at step S12. At step S13, determination is made whether the print switch is turned on or not. If the print switch is not turned on, steps S12 and S13 are repeated until the print switch is turned on. Upon determination of the print switch being turned on, control proceeds to step S14 to determine whether the test pattern read mode according to the present invention is specified by the above-described key inputs. If the test pattern read mode is not set, the normal image formation process of steps S15 and S17 is carried out. When a copy operation is completed, the process returns to step S2. When determination is made that a test mode read mode is set, the pattern read out operation set forth in the following is carried out. The correction data of the γ correction calculation coefficients obtained in this process is employed in the calculation of steps S7 and et seq.

Figure 23:
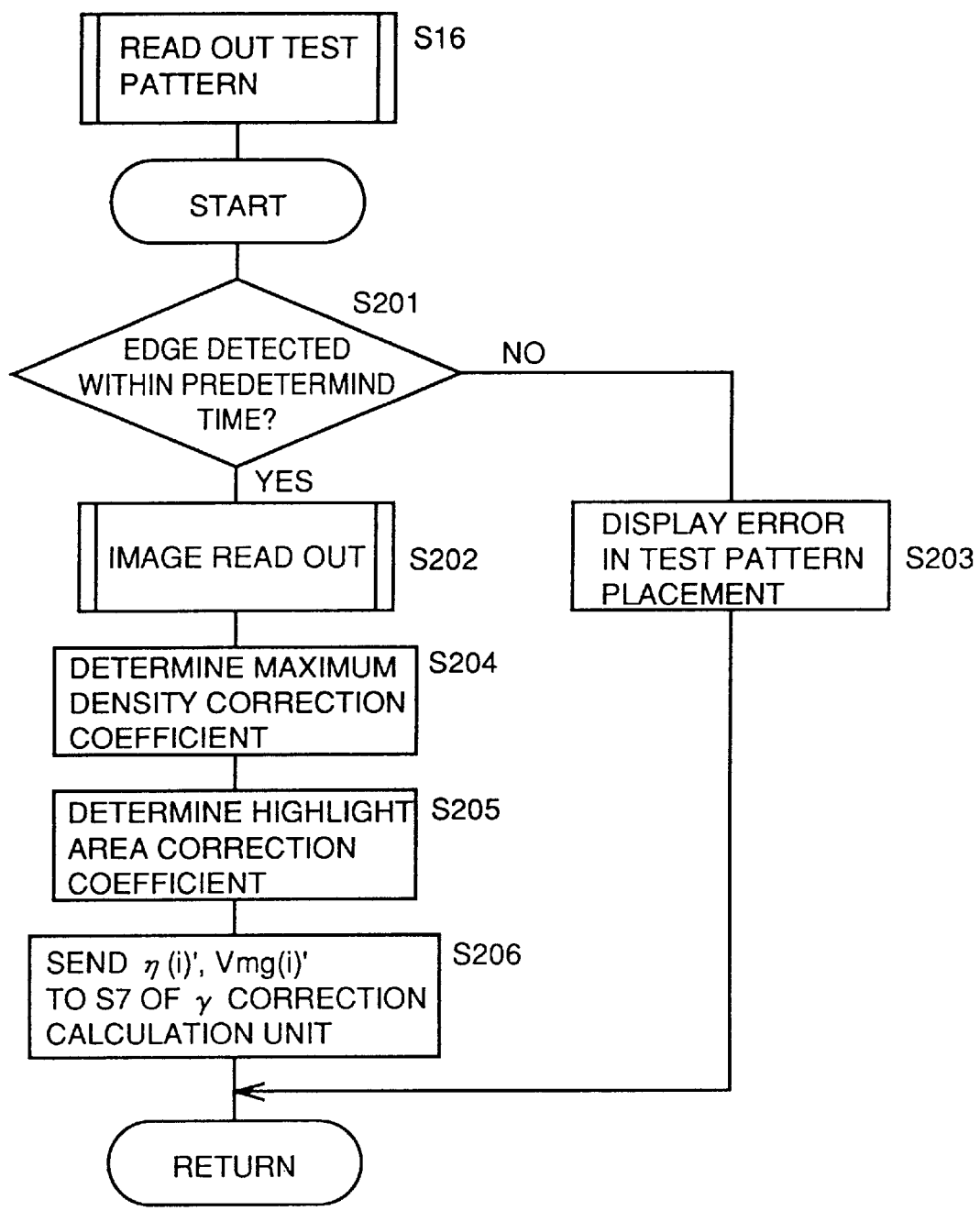
FIG. 23 is a flow chart for describing a γ correction calculation coefficient adjustment mode.

An operation of adjusting the γ correction calculation coefficients under a test pattern read out mode will be described in details with reference to the flow chart of FIG. 23. FIG. 23 is a flow chart for describing step S16 in detail. FIG. 23 shows the flow starting from reading out reflectance data of the pattern of interest of the test pattern printed out from a test pattern original to the determination of the maximum density correction coefficient and highlight correction coefficient which are transferred to the γ calculation unit.

Figure 25:
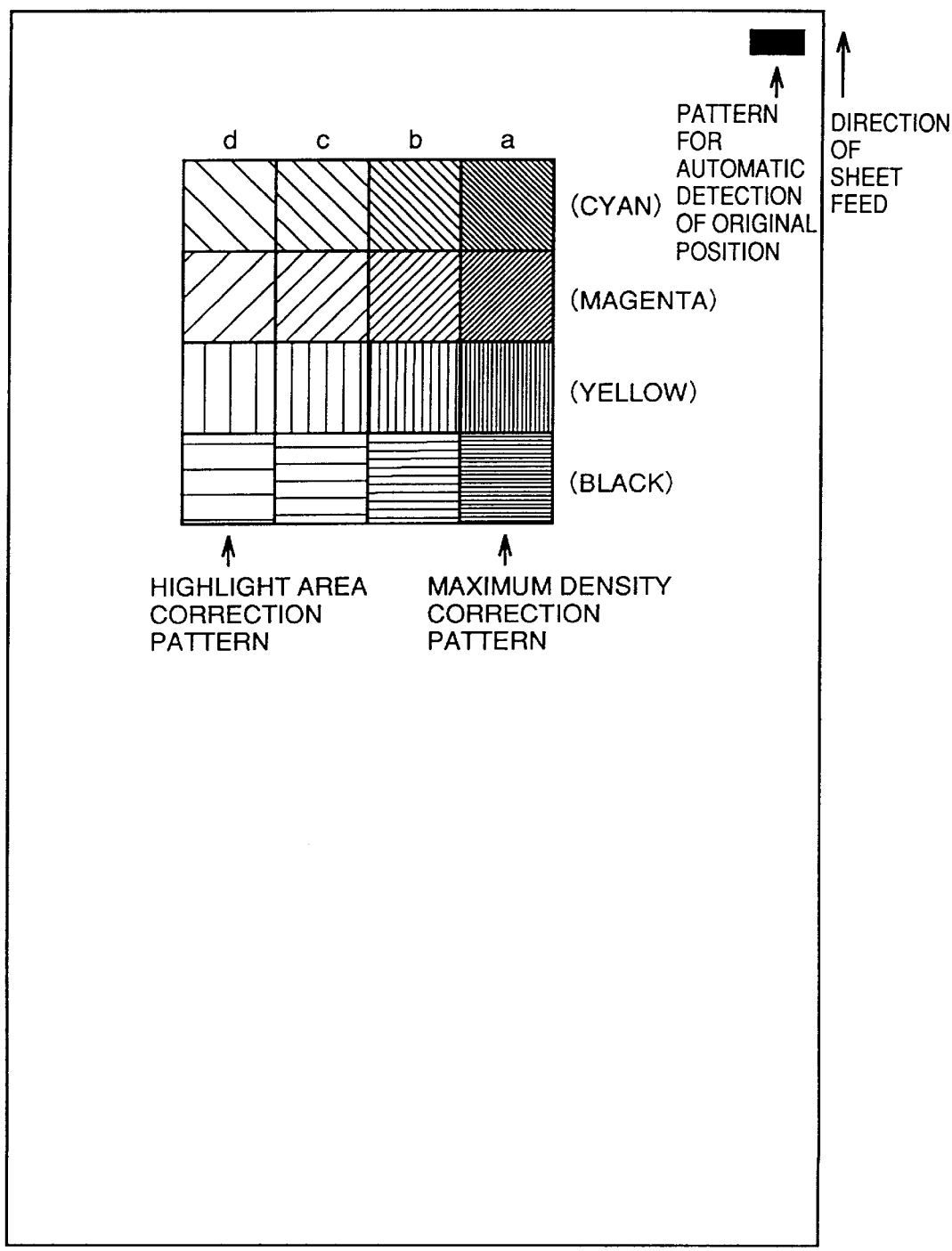
FIG. 25 shows a structure of a test pattern.

A test pattern original includes the gradation pattern of a plurality of colors as shown in, for example, FIG. 25. The test pattern is provided in the sequence of cyan, magenta, yellow, and black from the leading edge of the sheet in the forward direction, with a darker pattern density in the rightward direction. An edge signal detection pattern is provided at the right side of the leading edge of the sheet so that the position of the test pattern can be detected automatically. The test pattern original is placed on the platen, and the print switch is turned on. The test pattern is printed out on a recording medium (such as a paper sheet) according to steps S15 and S17 of FIG. 4. At this time point, test pattern read out mode set key 230 is not yet input.

Then, the test pattern that is printed out is placed on platen 40. Upon determination that the read out mode is set at step S14 of FIG. 4, control proceeds to step S16 to read out the pattern.

At step S201 of FIG. 23, the test pattern position on platen 40 is automatically detected. It is recognized that the test pattern is not placed properly at step S203 when the edge signal detection pattern is not detected within a predetermined time. The read out mode is interrupted, and an error message is displayed on the operation panel. If the test pattern is placed properly, image read out is carried out at step S202 of FIG. 24.

Figure 24:
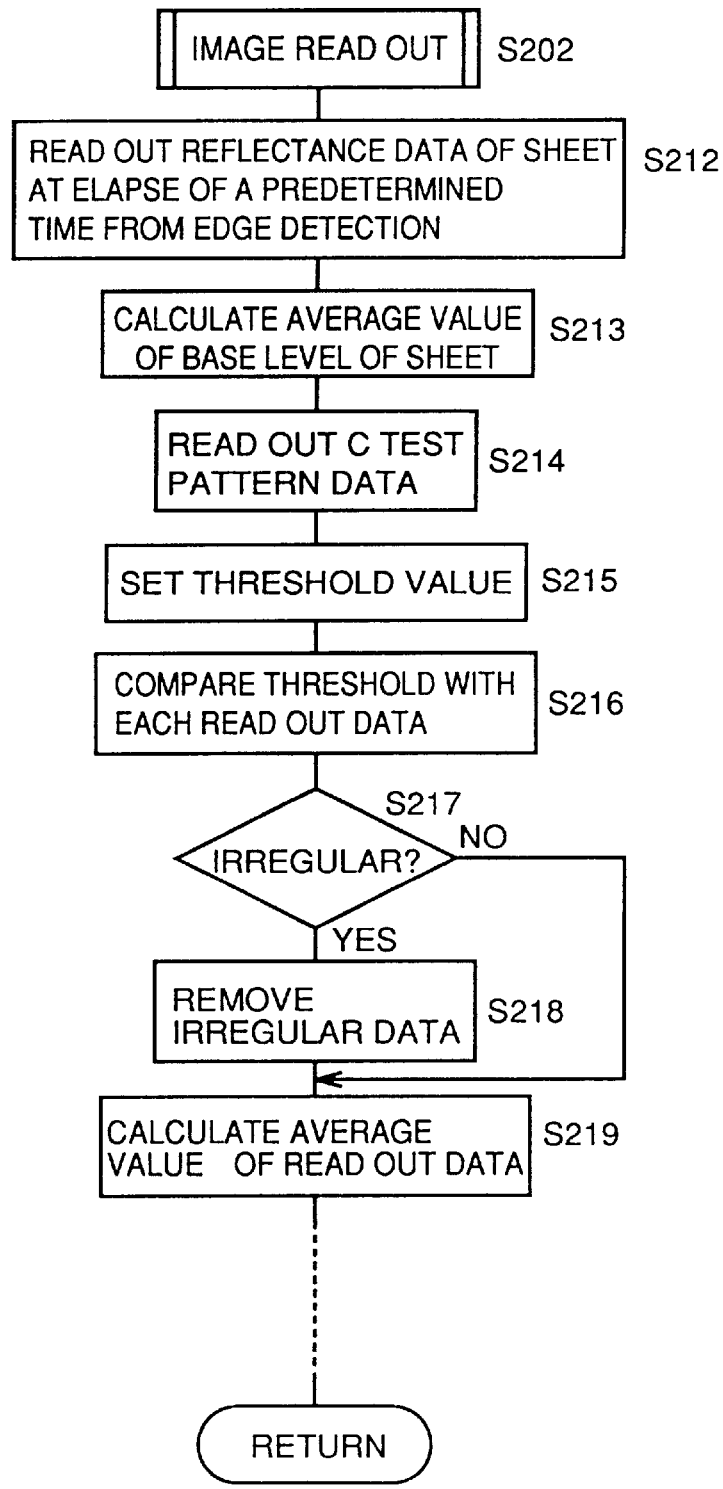
FIG. 24 is a flow chart for describing image read out of FIG. 23.

Details of image read out will be described hereinafter with reference to FIG. 24. Reflectance data of the recording sheet per se is read out at step S212 at an elapse of a predetermined time with the edge signal detection position as the reference position. At step S213, the average value is calculated. The reflectance data is read out by image reader unit 2 already described with reference to FIGS. 1 and 2.

At step S214, the test pattern data of cyan is read out. Data read out is carried out for each gradation level (a to d) for each test pattern. First, data of gradation level a is read out. At step S215, the threshold value of the reflectance data for cyan gradation level a is set. At step S216, each read out reflectance data is compared with the threshold value. At step S217, any data exceeding the threshold value is regarded to be irregular. At step S218, irregular data is removed. By this removal, effect of image noise and the like can be eliminated to improve the data detection accuracy. At step S219, the average of the data read out at the previous step is calculated.

Steps S214–S219 are similarly carried out for the test pattern gradation levels b to d of cyan. Then, the same steps are repeated for magenta, yellow and black.

Returning to FIG. 23, the steps of S204 and et seq. will be described. From step S204 onward, the maximum density and the fog of the highlight portion (development start threshold value, refer to above equation (16)) are corrected as to the coefficients of the γ correction calculation expressions using the data of each color and each gradation level obtained at step S202.

At step S204, the maximum density correction coefficient is determined. In the present embodiment, the data of gradation level a of each color is used. Since the test pattern at the high density area is hardly effected by the reflectance of the recording sheet, the reflectance data of the recording sheet obtained at step S213 is not taken into account. The error after Log conversion becomes greater when the data of the recording sheet is subtracted from the test pattern data.

FIGS. 26A–26D show the high density area correction table for each color. Assuming that the high density area data for cyan is, for example, 32, determination is made that the read out test pattern density is high from the cyan high density area correction table. The maximum density correction table is set to +3. The development efficiency obtained at step S6 of FIG. 4 is corrected using the following expression.

$$\eta(i)'=(100+ts)*\eta(I)/100 \qquad (20)$$

ts: maximum density correction value of each color obtained by maximum density correction table η(i): development efficiency of each color At step S205, the highlight area correction coefficient is determined. In the present embodiment, data of gradation level d of each color is used. The reflectance data of the recording sheet is accommodated in the test pattern of the highlight area. A read out data differential value is calculated.

FIGS. 27A–27D show the highlight area correction tables for each color. Assuming that the highlight area data of cyan is, for example, 37, determination is made that the density of the read out test pattern is low. The highlight area correction table is set to +2. The fog potential correction coefficient is corrected using the following equation.

As described above, the actual fog potential correction coefficient Vmg is obtained by equation (16). In the present process, the following equation (21) which is a slight modification of equation (16) is used.

$$Vmg(i)'=Vmg(i)+Kmg(i)/\eta(i)'*Vsp(i) \qquad (21)$$

Vmg(i)': fog potential correction coefficient used in subsequent calculation

Vmg(i): fog potential correction coefficient obtained by calculation

Kmg(i): constant set for each color

η(I)': development efficiency of each color obtained by high density area correction Vsp(i): highlight correction value of each color The correction coefficients obtained in steps S204 and S205 are transmitted to step S7 of the γ correction calculation unit of printer control unit 201. At steps S7–S11, calculation of γ correction is carried out. Then, the machine waits for the next input of the print switch.

Thus, image formation parameters and γ correction light emission characteristic data can be obtained by calculation at high accuracy. Therefore, a favorable image can be formed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation apparatus comprising:
   a density detection means for detecting a density of each pixel of an original,
   data generation means for generating image density data of each pixel of said original according to a detected result of said density detection means,
   γ correction means for correcting image density data generated by said data generation means so as to obtain desired gradation characteristic according to γ correction data,
   image forming means for generating a copy of said original on a recording medium according to said image density data corrected by said γ correction means,
   mode setting means for setting a correction mode to correct said γ correction data, and
   correction mode execution means for detecting by said density detection means density of a plurality of pixels of a copy of a test pattern original generated by said image forming means to correct said γ correction data according to a detected result in response to said correction mode being set by said mode setting means.

2. The image formation apparatus according to claim 1, further comprising parameter setting means for setting an image forming parameter of said image forming means,
   wherein said correction mode execution means corrects said γ correction data according to the image forming parameter set by said parameter setting means and the detected result of the density of the pixels of the original by said density detection means.

3. The image formation apparatus according to claim 1, wherein said test pattern original includes a colored area and a base level area, wherein said correction mode execution means obtains a difference in the densities of the colored area and the base level area of a copy of said test pattern original to correct said γ correction data according to the difference.

4. The image formation apparatus according to claim 1, wherein said test pattern original includes a gradation pattern of a single color or a plurality of colors, wherein said correction mode execution means corrects said γ correction data according to the densities of a plurality of areas of said gradation pattern area of the copy of said test pattern original.

5. The image forming apparatus of claim 1, wherein the recording medium is a sheet.

6. The image forming apparatus of claim 5, wherein the copy of a test pattern is on a recording sheet.

7. The image forming apparatus of claim 1, wherein the correction mode execution means detects the density of each pixel of the copy of the test pattern original.

8. An image formation apparatus comprising:

a density detection means for detecting a density of each pixel of an original, data generation means for generating an image density data of each pixel of said original according to a detected result of the density of each pixel of the original by said density detection means, γ correction means for correcting the image density data generated by said data generation means so as to obtain a desired gradation characteristic according to γ correction data, image forming means for forming a copy of said original on a recording medium according to said image density data corrected by said γ correction means, parameter setting means for setting an image forming parameter of said image forming means, calculation means for calculating said γ correction data according to the image forming parameter set by said parameter setting means and a calculation coefficient, mode setting means for setting a calculation coefficient correction mode to correct said calculation coefficient used in said calculation means, and correction mode execution means for detecting by said density detection means a density of a plurality of pixels of a copy of a test pattern original generated by said image forming means to correct said calculation coefficient used in said calculation means according to the detected result of the density of the pixels of the copy of the test pattern original in response to said calculation coefficient correction mode being set by said mode setting means.

9. The image forming apparatus of claim 8, wherein the recording medium is a sheet.

10. The image forming apparatus of claim 9, wherein the copy of a test pattern is on a recording sheet.

11. The image forming apparatus of claim 8, wherein the correction mode execution means detects the density of each pixel of the copy of the test pattern original.

12. A method of adjusting an image forming apparatus comprising:

a first step of detecting an image density of a plurality of pixels of a test pattern original, a second step of generating image density data of the pixels of said test pattern original according to a detected result of said image density of said first step, a third step of correcting the image density data of said test pattern original generated by said second step so that a desired gradation characteristic is obtained according to γ correction data, a fourth step of generating a copy of said test pattern original on a recording medium according to the image density data corrected by said third step, a fifth step of detecting an image density of each pixel of the copy of said test pattern original, and a sixth step of correcting said γ correction data according to the image density of each pixel of the copy of said test pattern original detected at said fifth step.

13. The method of adjusting an image forming apparatus according to claim 12, wherein said test pattern original includes a colored area and a base level area, wherein said sixth step obtains a difference in the densities of the colored area and the base level area of a copy of said test pattern original to correct said γ correction data according to the difference.

14. The method of adjusting an image formation apparatus according to claim 12, wherein said test pattern original includes a gradation pattern of a single color or a plurality of colors, wherein said sixth step corrects said γ correction data according to the densities of a plurality of areas of said gradation pattern area of the copy of said test pattern original.

* * * * *